US012253005B2

(12) United States Patent
Yadav et al.

(10) Patent No.: US 12,253,005 B2
(45) Date of Patent: Mar. 18, 2025

(54) ROTATING AIRFOIL WITH A SPRING DAMPER SYSTEM

(71) Applicant: General Electric Company, Schenectady, NY (US)

(72) Inventors: Abhijeet Yadav, Bengaluru (IN); Nicholas J. Kray, Mason, OH (US); Nitesh Jain, Bengaluru (IN)

(73) Assignee: GENERAL ELECTRIC COMPANY, Evendale, OH (US)

(*) Notice: Subject to any disclaimer, the term of this patent is extended or adjusted under 35 U.S.C. 154(b) by 112 days.

(21) Appl. No.: 18/046,657

(22) Filed: Oct. 14, 2022

(65) Prior Publication Data

US 2023/0407750 A1 Dec. 21, 2023

(30) Foreign Application Priority Data

Jun. 17, 2022 (IN) ............................. 202211034888

(51) Int. Cl.
*F01D 5/16* (2006.01)

(52) U.S. Cl.
CPC ............ *F01D 5/16* (2013.01); *F05D 2220/36* (2013.01)

(58) Field of Classification Search
CPC ..... F01D 5/10; F01D 5/16; F01D 5/26; F01D 25/06; F01D 7/00; F01D 17/162; F05D 2260/15; F05D 2260/38; F05D 2260/74; F05D 2260/75; F05D 2260/77; F05D 2260/78; F05D 2260/96; F05D 2270/42
See application file for complete search history.

(56) References Cited

U.S. PATENT DOCUMENTS

| | | | | | |
|---|---|---|---|---|---|
| 2,177,315 | A * | 10/1939 | De Caria | B64C 11/346 416/139 |
| 2,238,179 | A | 4/1941 | McIntosh | |
| 2,653,668 | A | 9/1953 | Anderson | |
| 2,992,687 | A * | 7/1961 | Brett | B64C 11/385 416/50 |
| 3,311,327 | A | 3/1967 | Greulich | |
| 3,321,023 | A | 5/1967 | Russell et al. | |
| 3,470,748 | A * | 10/1969 | Barnes | G05D 13/06 73/522 |
| 3,637,323 | A * | 1/1972 | Chilman | B64C 11/30 416/157 R |
| 3,792,937 | A * | 2/1974 | Chilman | B64C 11/32 416/157 R |

(Continued)

FOREIGN PATENT DOCUMENTS

| | | | | |
|---|---|---|---|---|
| CN | 101230789 A * | 7/2008 | F01D 7/00 |
| DE | 102010009863 A1 * | 9/2011 | F01D 7/00 |

(Continued)

OTHER PUBLICATIONS

CN_101230789 (Year: 2008)—English Translation.*
DE_102010009863 (Year: 2011)—English Translation.*
FR_3067415 (Year: 2019)—English Translation.*

*Primary Examiner* — Brian P Wolcott
(74) *Attorney, Agent, or Firm* — Venable LLP; Michael C. Sanko; Michele V. Frank

(57) ABSTRACT

An airfoil structure including an airfoil and a spring and damper system. The airfoil including a longitudinal axis. The spring and damper system is connected to the airfoil to rotate the airfoil about the longitudinal axis to change airfoil pitch in response to a load applied to the airfoil.

20 Claims, 18 Drawing Sheets

(56) References Cited

U.S. PATENT DOCUMENTS

| | | | | |
|---|---|---|---|---|
| 4,037,986 | A * | 7/1977 | Chilman | F01D 7/00 416/157 R |
| 4,045,149 | A * | 8/1977 | Ravenhall | F01D 5/282 416/135 |
| 4,221,541 | A * | 9/1980 | Bianchi | F04D 29/362 416/157 R |
| 5,197,692 | A | 3/1993 | Jones et al. | |
| 7,165,744 | B2 | 1/2007 | Howarth et al. | |
| 7,448,847 | B2 * | 11/2008 | Lim | F01D 17/165 415/164 |
| 7,607,892 | B2 | 10/2009 | Beroul | |
| 8,449,256 | B2 * | 5/2013 | Bianchi | B63H 3/008 416/50 |
| 8,845,270 | B2 | 9/2014 | Nordstrom | |
| 9,022,318 | B2 | 5/2015 | Laude | |
| 9,506,358 | B2 * | 11/2016 | Bianchi | F01D 7/00 |
| 9,599,121 | B2 | 3/2017 | Fabre et al. | |
| 9,896,189 | B2 * | 2/2018 | Tajan | B64C 11/346 |
| 10,288,083 | B2 * | 5/2019 | Miller | F01D 7/00 |
| 10,392,119 | B2 | 8/2019 | Niergarth et al. | |
| 10,597,144 | B2 | 3/2020 | Fotouhie | |
| 10,773,816 | B2 | 9/2020 | Looper et al. | |
| 11,795,964 | B2 * | 10/2023 | Daggett | F02C 3/06 |
| 11,834,960 | B2 * | 12/2023 | Kray | F01D 5/26 |
| 2015/0091228 | A1 * | 4/2015 | Hoffmann | F16F 13/00 267/140.13 |
| 2019/0301288 | A1 * | 10/2019 | Umehara | F01D 5/16 |
| 2020/0392864 | A1 | 12/2020 | Epureanu et al. | |
| 2021/0222585 | A1 | 7/2021 | Begin | |
| 2021/0261262 | A1 | 8/2021 | Schelfaut et al. | |
| 2021/0284348 | A1 | 9/2021 | Whiteford | |
| 2023/0265760 | A1 * | 8/2023 | Kray | F01D 25/06 415/119 |

FOREIGN PATENT DOCUMENTS

| | | | | |
|---|---|---|---|---|
| EP | 3112588 | B1 | 5/2020 | |
| FR | 3067415 | B1 * | 7/2019 | B64C 11/343 |
| FR | 3087830 | B1 | 10/2020 | |
| FR | 3127269 | A1 | 3/2023 | |
| FR | 3130896 | A1 | 6/2023 | |
| FR | 3130897 | A1 | 6/2023 | |
| FR | 3133367 | A1 | 9/2023 | |
| FR | 3133368 | A1 | 9/2023 | |

* cited by examiner

ROTATING AIRFOIL WITH A SPRING DAMPER SYSTEM

CROSS REFERENCE TO RELATED APPLICATIONS

The present application claims the benefit of Indian Patent Application No. 202211034888, filed on Jun. 17, 2022, which is hereby incorporated by reference herein in its entirety.

TECHNICAL FIELD

The present disclosure relates to a rotating airfoil assembly, particularly, a rotating airfoil assembly for an engine producing thrust for an aircraft, such as a fan or a propeller.

BACKGROUND

Thrust used to move an aircraft through the air may be produced by a plurality of airfoils rotating about a central axis, such as, for example, the fan blades of a fan for an unducted single fan engine or the propellers on a propeller driven aircraft. As the fan or the propeller rotates, some of the blades are traveling in a downward direction and others are traveling in an upward direction.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
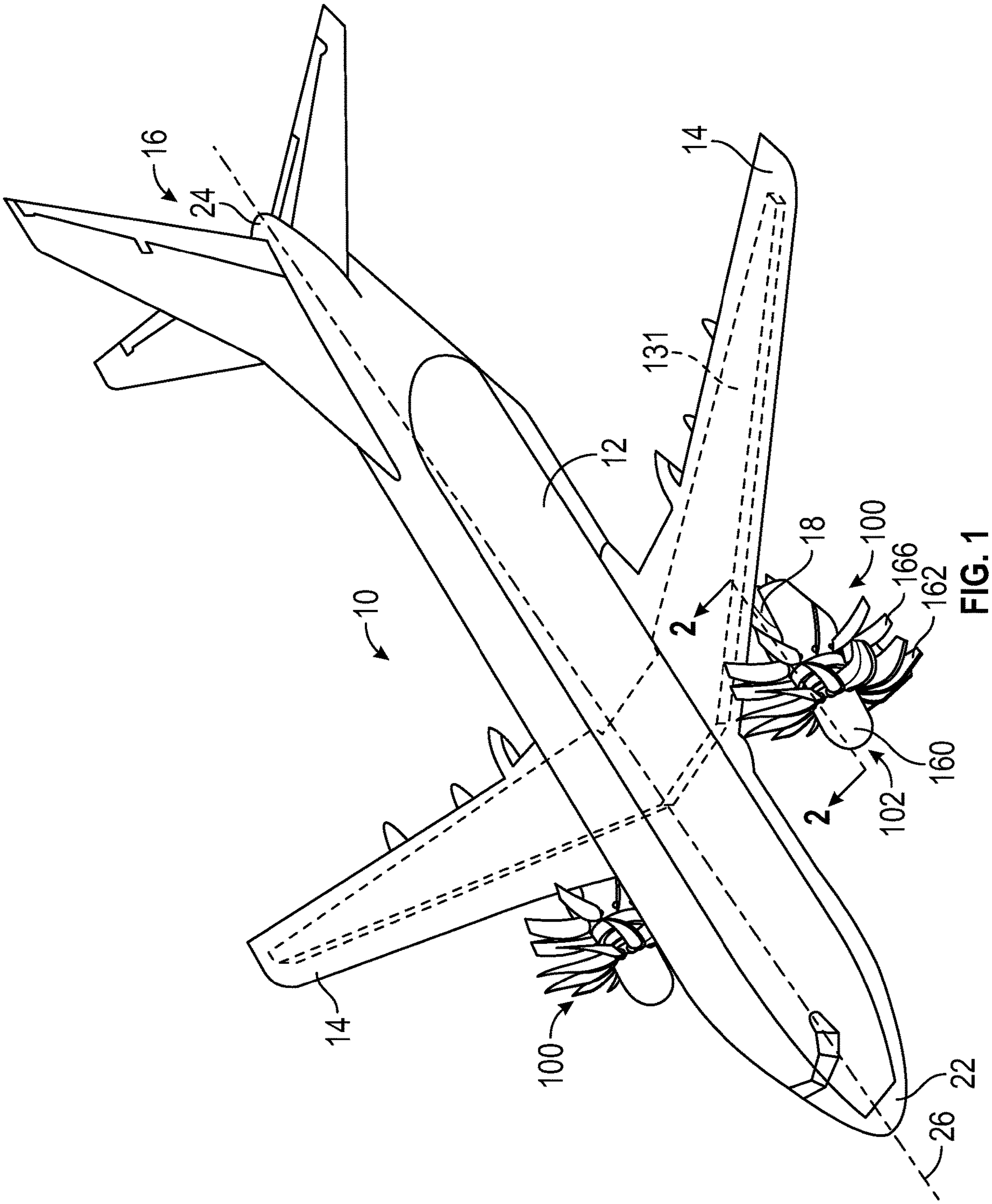
FIG. 1 is a schematic perspective view of an aircraft having unducted single fan engines with a rotating airfoil according to an embodiment of the present disclosure.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet, and aft refers to a position closer to an engine nozzle or an exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled,” “fixed,” “attached,” “connected,” and the like, refer to both direct coupling, fixing, attaching, or connecting, as well as indirect coupling, fixing, attaching, or connecting through one or more intermediate components or features, unless otherwise specified herein.

The singular forms “a,” “an,” and “the” include plural references unless the context clearly dictates otherwise.

As noted above, thrust used to move an aircraft through the air may be produced by a plurality of airfoils rotating about a central axis, such as, for example, the fan blades of a fan for an unducted single fan engine or the propellers on a propeller driven aircraft with some of the blades traveling in a downward direction and others traveling in an upward direction. When the aircraft is flying level, air flows into the fan or the propeller in an axial direction of the fan or the propeller, and the downward traveling blades and the upward traveling blades produce an equal amount of thrust. But, when the aircraft has an angle of attack, the air flows into the fan or the propeller with a non-axial component and the downward traveling blades produce a different amount of thrust than the upward traveling blades. For example, when the aircraft is pitched upward, such as during takeoff, the downward traveling blades produce a greater amount of thrust than the upward traveling blades, resulting in asymmetric loading of the fan blades or the propeller. Thus, in one rotation, the rotating airfoil (fan blade or propeller) is subjected to differential loads (a 1P load) resulting in a cyclic loading condition for the rotating airfoil. Among other things, these cyclic loads can subject the rotating airfoil to fatigue stresses and strains.

A rotating airfoil, such as the fan blades of a fan for a turbofan engine or the propellers on a propeller driven aircraft, may be subjected to differential loading during rotation (1P loading) when the rotation axis, about which the rotating airfoil rotates, is angled (such as pitched upward or pitched downward) relative to the flow of air into the fan or the propeller. Put another way, this 1P loading may occur when the airflow into a propeller is not perpendicular to the plane in which the rotating airfoil rotates. The embodiments discussed herein reduce the magnitude of the asymmetric load produced by the rotating airfoils or even eliminate the asymmetric load. In some embodiments discussed herein, the rotation axis of rotating airfoil assembly is aligned with the airflow into the rotating airfoil assembly or at least the angle of attack is reduced when the aircraft has an angle of attack. In some embodiments discussed herein, the entire engine is rotated when the aircraft has an angle of attack to align the engine and, thus, the rotating airfoil assembly is aligned with the airflow into the rotating airfoil assembly, but, in other embodiments, the rotating airfoil assembly is rotated with other portions of the engine remaining fixed relative to their orientation to the aircraft. In still other embodiments, the rotating airfoils themselves may change their orientation as they rotate about the rotation axis, thereby changing the plane of rotation of the rotating airfoil. In some embodiments discussed herein, the rotating airfoils are actively rotated by a controller and actuators. In a further embodiment, the angle of the rotating airfoil (blade) may be changed to reduce the asymmetric loading on the rotating airfoil assembly, and, in the embodiment discussed below, this rotation is passive driven by the differential pressure on the rotating airfoil.

The rotating airfoils discussed herein are suitable for use with rotating airfoil assemblies used to produce thrust for fixed wing aircraft, and, in particular, for open rotor engines such as propellers or unducted fan engines. FIG. 1 is a perspective view of an aircraft 10 that may implement various preferred embodiments. The aircraft 10 includes a fuselage 12, a pair of wings 14 attached to the fuselage 12, and an empennage 16. The fuselage 12 includes a nose 22 and a tail 24 with a centerline 26 extending from the nose 22 to the tail 24. The centerline 26 of the fuselage 12 is also the centerline 26 of the aircraft 10 in this embodiment. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are unducted single fan engines that are each capable of selectively generating a propulsive thrust for the aircraft 10. The amount of propulsive thrust may be controlled at least in part based on a volume of fuel provided to the unducted single fan engines via a fuel system 130 (see FIG. 2). An aviation turbine fuel in the embodiments discussed herein is a combustible hydrocarbon liquid fuel, such as a kerosene-type fuel, having a desired carbon number. The fuel is stored in a fuel tank 131 of the fuel system 130. As shown in FIG. 1, at least a portion of the fuel tank 131 is located in each wing 14 and a portion of the fuel tank 131 is located in the fuselage 12 between the wings 14. The fuel tank 131, however, may be located at other suitable locations in the fuselage 12 or the wing 14. The fuel tank 131 may also be located entirely within the fuselage 12 or the wing 14. The fuel tank 131 may also be separate tanks instead of a single, unitary body, such as, for example, two tanks each located within a corresponding wing 14.

Figure 2:
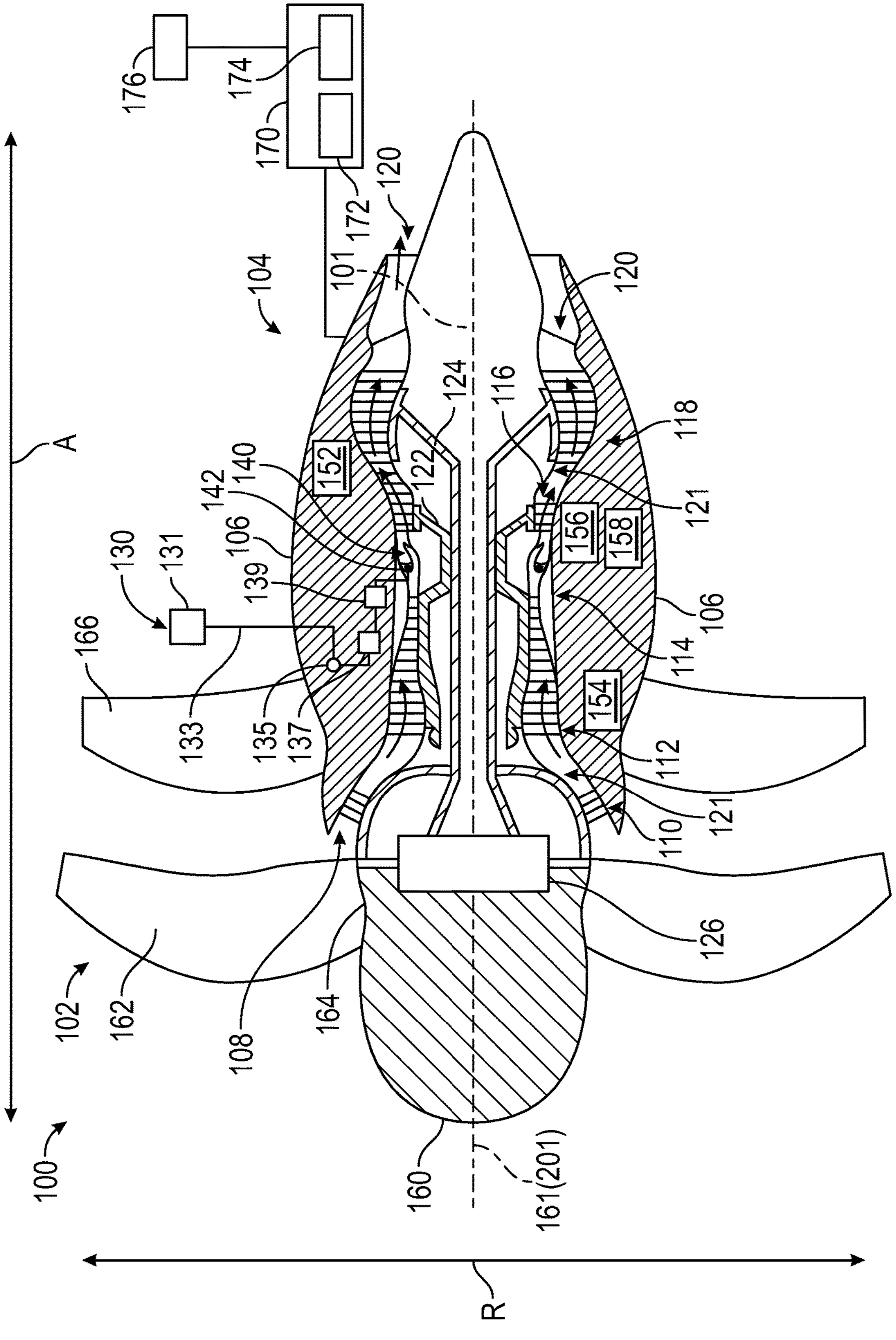
FIG. 2 is a schematic, cross-sectional view, taken along line 2-2 in FIG. 1, of one of the unducted single fan engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. As noted above, the engine 100 is an unducted single fan engine. The unducted single fan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101. The unducted single fan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbomachine 104 further includes one or more drive shafts. More specifically, the turbomachine 104 includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The unducted single fan engine 100, more specifically, the turbomachine 104, is operable with the fuel system 130 and receives a flow of fuel from the fuel system 130. The fuel system 130 includes a fuel delivery assembly 133 providing the fuel flow from the fuel tank 131 to the unducted single fan engine 100, and, more specifically, to a plurality of fuel nozzles 142 that inject fuel into a combustion chamber of a combustor 140 of the combustion section 114. The fuel delivery assembly 133 includes tubes, pipes, conduits, and the like, to fluidly connect the various components of the fuel system 130 to the unducted single fan engine 100. The fuel tank 131 is configured to store the hydrocarbon fuel, and the hydrocarbon fuel is supplied from the fuel tank 131 to the fuel delivery assembly 133. The fuel delivery assembly 133 is configured to carry the hydrocarbon fuel between the fuel tank 131 and the unducted single fan engine 100 and, thus, provides a flow path (fluid pathway) of the hydrocarbon fuel from the fuel tank 131 to the unducted single fan engine 100.

The fuel system 130 includes at least one fuel pump fluidly connected to the fuel delivery assembly 133 to induce the flow of the fuel through the fuel delivery assembly 133 to the unducted single fan engine 100. One such pump is a main fuel pump 135. The main fuel pump 135 is a high-pressure pump that is the primary source of pressure rise in the fuel delivery assembly 133 between the fuel tank 131 and the unducted single fan engine 100. The main fuel pump 135 may be configured to increase a pressure in the fuel delivery assembly 133 to a pressure greater than a pressure within the combustion chamber of the combustor 140.

The fuel system 130 also includes a fuel metering unit 137 in fluid communication with the fuel delivery assembly 133. Any fuel metering unit 137 may be used including, for example, a metering valve. The fuel metering unit 137 is positioned downstream of the main fuel pump 135 and upstream of a fuel manifold 139 configured to distribute fuel to the fuel nozzles 142. The fuel system 130 is configured to provide the fuel to fuel metering unit 137, and the fuel metering unit 137 is configured to receive fuel from the fuel tank 131. The fuel metering unit 137 is further configured to provide a flow of fuel to the unducted single fan engine 100 in a desired manner. More specifically, the fuel metering unit 137 is configured to meter the fuel and to provide a desired volume of fuel, at, for example, a desired flow rate, to the fuel manifold 139 of the unducted single fan engine 100. The fuel manifold 139 is fluidly connected to the fuel nozzles 142 and distributes (provides) the fuel received to the plurality of fuel nozzles 142, where the fuel is injected into the combustion chamber and combusted. Adjusting the fuel metering unit 137 changes the volume of fuel provided to the combustion chamber and, thus, changes the amount of propulsive thrust produced by the unducted single fan engine 100 to propel the aircraft 10.

The unducted single fan engine 100 also includes various accessory systems to aid in the operation of the unducted single fan engine 100 and/or the aircraft 10. For example, the unducted single fan engine 100 may include a main lubrication system 152, a compressor cooling air (CCA) system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components through the use of one or more heat exchangers. The compressor cooling air (CCA) system 154 provides air from one or both of the HP compressor 112 or the LP compressor 110 to one or both of the HP turbine 116 or the LP turbine 118. The active thermal clearance control (ATCC) system 156 acts to minimize a clearance between tips of turbine blades and casing walls as casing temperatures vary during a flight mission. The generator lubrication system 158 provides lubrication to an electronic generator (not shown), as well as cooling/heat removal for the electronic generator. The electronic generator may provide electrical power to, for example, a startup electrical motor for the unducted single fan engine 100 and/or various other electronic components of the unducted single fan engine 100 and/or an aircraft 10. The lubrication systems for the unducted single fan engine 100 (e.g., the main lubrication system 152 and the generator lubrication system 158) may use hydrocarbon fluids, such as oil, for lubrication, in which the oil circulates through inner surfaces of oil scavenge lines.

The fan section 102 of the unducted single fan engine 100 includes a plurality of fan blades 162 coupled to a fan hub 164 (or disk). The fan blades 162 and the fan hub 164 are rotatable, together, circumferentially about a rotation axis 161, which, in this embodiment, is coincident with the longitudinal centerline (axis) 101. In this embodiment, a spinner 160 is connected to the fan hub 164, and the spinner 160 rotates with respect to the outer casing 106. Each of the fan blades 162 is an airfoil and, more specifically, a rotating airfoil. The fan blades 162, together with the fan hub 164, in this embodiment, comprise a rotating airfoil assembly.

The turbomachine 104 of this embodiment is a torque producing system that generates torque to rotate the fan blades 162. The turbomachine 104 is configured to operate (e.g., to rotate) the fan hub 164. The fan hub 164 may be coupled to a shaft, and, more specifically, the LP shaft 124, of the turbomachine 104, and the LP shaft 124 rotates the fan blades 162 and the fan hub 164. In some embodiments, the LP shaft 124 may be coupled to the fan hub 164 in a direct drive configuration, but, in this embodiment, the LP shaft 124 is coupled to a reduction gearbox 126 that, in turn, transmits a rotational (torsional) force to rotate the fan hub 164. The reduction gearbox 126 may be configured to reduce input rotational speed from the LP shaft 124 to a speed suitable for rotating the fan blades 162.

Coupled to the outer casing 106 may be one or more outlet guide vanes 166. In this embodiment, the outlet guide vanes 166 are positioned aft of the fan blades 162. In this embodiment, the outer casing 106 is stationary such that the one or more outlet guide vanes 166 do not rotate around the longitudinal centerline 101 and are, thus, stationary with respect to rotation about the longitudinal centerline 101. Although the outlet guide vanes 166 are stationary with respect to the longitudinal centerline 101, the outlet guide vanes 166 are capable of being rotated or moved with respect to the outer casing 106.

During operation of the unducted single fan engine 100, air flows from the left side of FIG. 2 toward the right side of FIG. 2. A portion of the air flow may flow past the fan blades 162 and the outlet guide vanes 166. A portion of the air flow may enter the outer casing 106 through the annular inlet 108 as the air flowing through core air flowpath 121 to be mixed with the fuel for combustion in the combustor 140 and exit through the jet exhaust nozzle section 120. As noted above, the outlet guide vanes 166 may be movable with respect to the outer casing 106 to guide the air flow in a particular direction. Each outlet guide vane 166 may be movable to adjust the lean, pitch, sweep, or any combination thereof, of the outlet guide vane 166.

In the embodiment shown in FIGS. 1 and 2, a forward end or a front portion of the outer casing 106 includes the one or more fan blades 162 and the one or more outlet guide vanes 166. In other embodiments, the one or more fan blades 162 and the one or more outlet guide vanes 166 may have a different arrangement with respect to the outer casing 106. For example, the one or more fan blades 162 and the one or more outlet guide vanes 166 may be located on an aft end or a rear portion of the outer casing 106, such as coupled to a rear portion of the outer casing 106. More specifically, the one or more fan blades 162 and the one or more outlet guide vanes 166 may be coupled to a rear portion of the outer casing 106.

In other embodiments, an engine according to this disclosure may be configured to have stationary vanes positioned forward of the rotating fan blades 162 (thus, the vanes 166 are inlet guide vanes). Although the outlet guide vanes 166 may be stationary and not rotate about the longitudinal centerline 101, as described above, the one or more outlet guide vanes 166 may rotate counter to the one or more fan blades 162 such that the one or more outlet guide vanes 166 are contra-rotating rotors in a contra-rotating open rotor (CROR) engine. Either pusher configurations, where the rotors are forward of the pylon 18, or puller configurations, where the rotors are aft of the pylon 18 are contemplated. In such a case, the contra-rotating rotors may also be rotating airfoils that are part of a rotating airfoil assembly, as discussed further below.

The engine 100 also includes an engine controller 170 configured to operate various systems of the engine 100, including for example, the rotation of the engine 100, the fan section 102, and/or fan blades 162, as discussed below. In this embodiment, the engine controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application specific integrated circuit (ASIC), and/or a Field Programmable Gate Array (FPGA). The memory 174 can include one or more computer-readable media, including, but not limited to, non-transitory computer-readable media, a computer readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, cause the processor 172 and the engine controller 170 to perform operations. In some embodiments, the instructions can be executed by the processor 172 to cause the processor 172 to complete any of the operations and functions for which the engine controller 170 is configured, as will be described further below. The instructions can be software written in any suitable programming language or can be implemented in hardware. Additionally, and/or alternatively, the instructions can be executed in logically and/or virtually separate threads on the processor 172. The memory 174 can further store data that can be accessed by the processor 172.

The engine controller 170 may be directly communicatively coupled to a sensor 176 to receive various inputs including, for example, sensors that monitor the operation of the engine 100 and/or the aircraft 10. The engine controller 170 may also be indirectly coupled to such sensors and receive inputs from another source, such as a flight controller for the aircraft 10. The engine controller 170 may be communicatively coupled to other controllers, such as a flight controller, and exchange data, and commands with these other controllers. The engine controller 170 may thus receive various inputs, data, and commands from these other controllers.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The example of the rotating airfoil assembly shown in FIGS. 1 and 2 is the fan blades 162, together with the fan hub 164, but the embodiments discussed herein may be applicable to other rotating airfoil assemblies. Other rotating airfoil assemblies include, for example, a propeller assembly, such as a propeller assembly for a turboprop engine. Such a propeller assembly may include a plurality of propeller blades that are coupled to and extend outwardly from a propeller shaft. The propeller assembly of a turboprop engine may be driven by a turbomachine (similar to the turbomachine 104 discussed above) to rotate about a rotation axis of the propeller shaft. The propeller blades are airfoils, more specifically, rotating airfoils, and the propeller assembly is another example of a rotating airfoil assembly. The propeller assembly is an open rotor system that may also experience asymmetric loading on the propeller blades with the longitudinal centerline of the turboprop engine being angled (such as pitched upward or downward) relative to the flow of air into the propeller assembly.

The torque producing system discussed above for the engine 100 shown in FIGS. 1 to 2 is turbomachine 104. Other suitable torque producing systems, however, may be used to rotate the rotating airfoils (e.g., fan blades 162) and rotating airfoil assemblies (e.g., fan hub 164 and fan blades 162). Other suitable torque producing systems include other engines, such as reciprocating engines, for example. Although the aircraft 10 shown in FIG. 1 is an airplane, the embodiments described herein may also be applicable to other aircraft 10, including, for example, other fixed-wing unmanned aerial vehicles (UAV).

Figure 3:
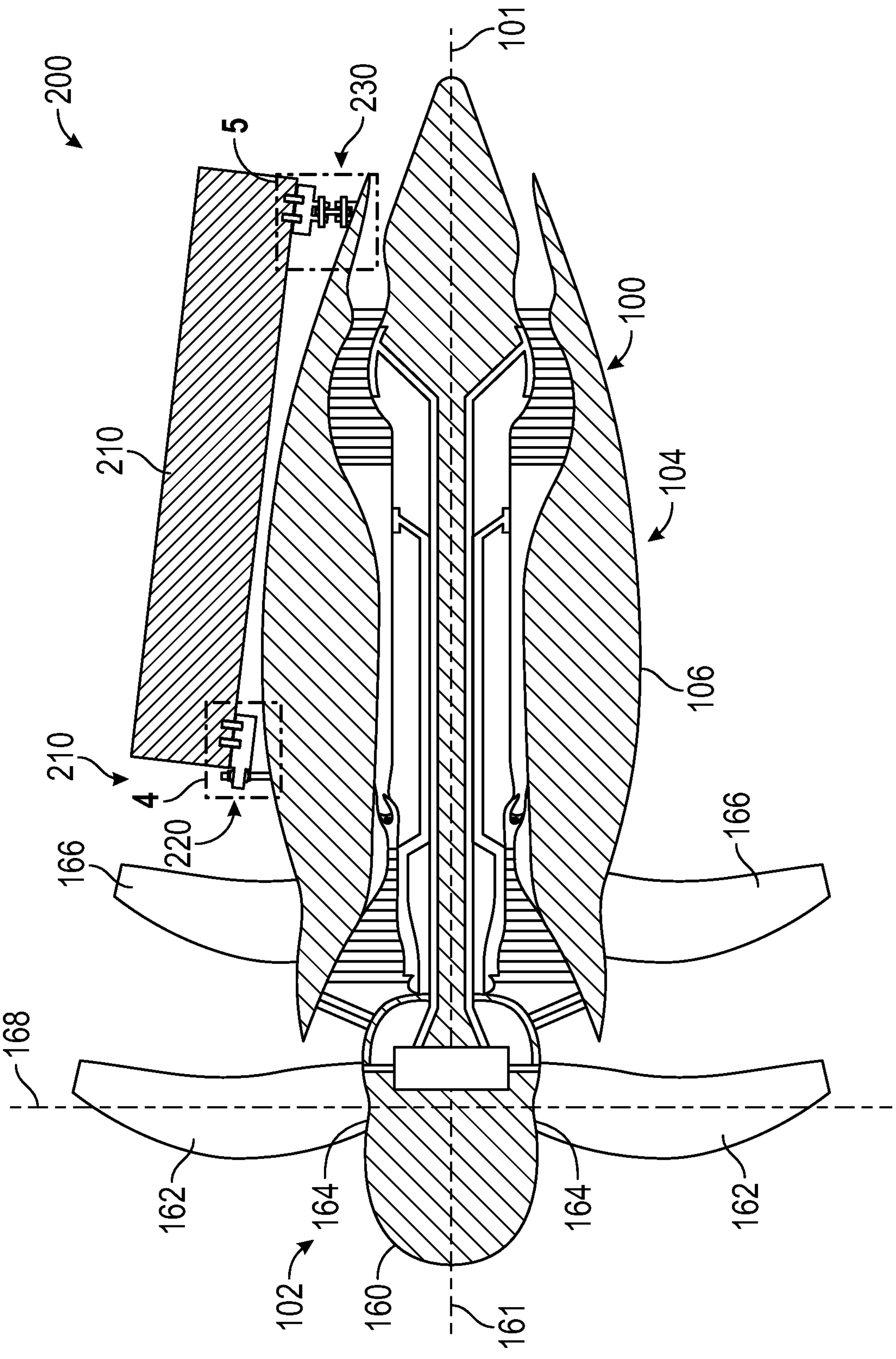
FIG. 3 is another schematic, cross-sectional view, taken along line 2-2 in FIG. 1, of one of the unducted single fan engines of the aircraft shown in FIG. 1, showing an engine mounting system used to mount the engine to a wing of the aircraft.

FIG. 3 shows an engine mounting system 200 that may be used to mount the engine 100 to the aircraft 10. FIG. 3 is a cross-sectional view of the engine mounting system 200. The engine mounting system 200 includes an engine support structure 210. The engine support structure 210 may be the pylon 18 that extends from the aircraft 10, such as from the fuselage 12, the wing 14, or the empennage 16 of the aircraft 10 (see FIG. 1). In this embodiment, the engine 100 is attached to one of the wings 14 by the pylon 18 (engine support structure 210) in an under-wing configuration, and the engine support structure 210 extends downwardly beneath the wing 14. The engine mounting system 200 includes a plurality of mounts coupling the engine 100 to the engine support structure 210. In this embodiment, the engine mounting system 200 includes a forward mount 220 and an aft mount 230. The engine 100 includes a plurality of frames including a forward frame 182 (see FIG. 4) and an aft frame 184 (see FIG. 5). The outer casing 106 may connect to the forward frame 182 and the aft frame 184. In some embodiments, the forward frame 182 may be disposed generally about the compressor section of the turbomachine 104, and the aft frame 184 may be disposed generally about the turbine sections of the turbomachine 104. The outer casing 106 may sometimes be referred to as the backbone of the engine 100.

Figure 4:
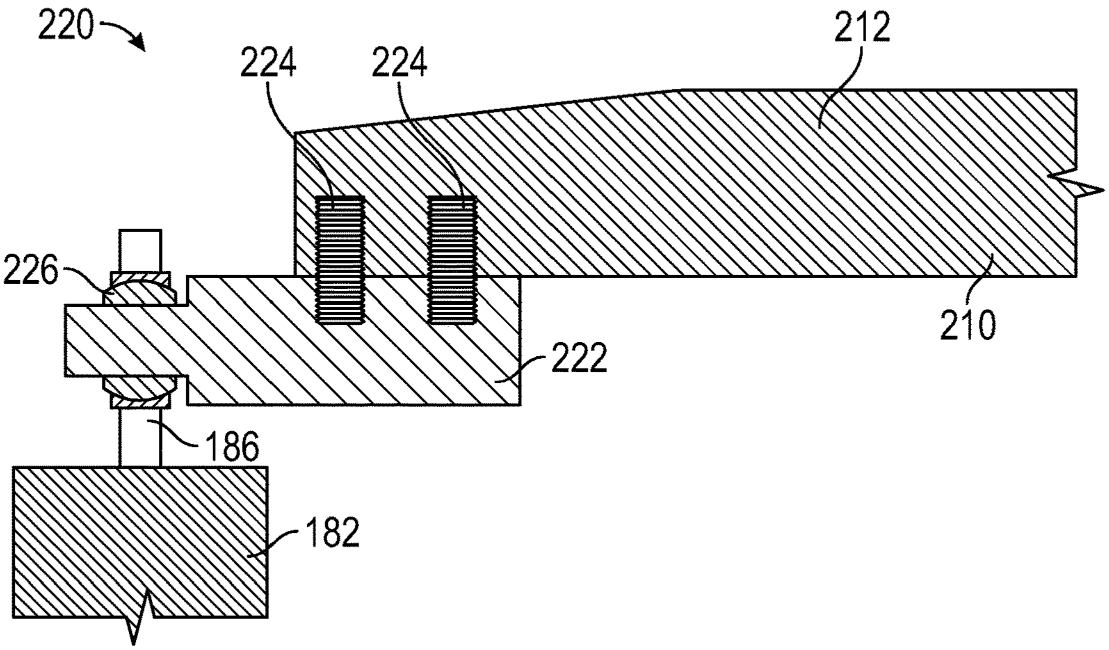
FIG. 4 is a detail cross-sectional view, showing detail 4 in FIG. 3, of a forward mount of the engine mount system shown in FIG. 3.

FIG. 4 is a cross-sectional detail view of the forward mount 220 showing detail 4 in FIG. 3. Although any suitable mount may be used, the forward mount 220 of this embodiment includes a forward mount beam 222 attached to a forward section 212 of the engine support structure 210. The forward mount beam 222 is attached to the engine support structure 210 using any suitable means including, for example, fasteners. In this embodiment, a plurality of bolts 224 are used to attach the forward mount beam 222 to the engine support structure 210. The forward mount beam 222 includes a spherical mono-ball bearing 226 attached to a forward end of the forward mount beam 222. A mount lug 186, which, in this embodiment, is integrally formed with the forward frame 182, is connected to and engages with the mono-ball bearing 226 to connect the forward frame 182 and, thus the engine 100 to the forward mount beam 222.

Figure 5:
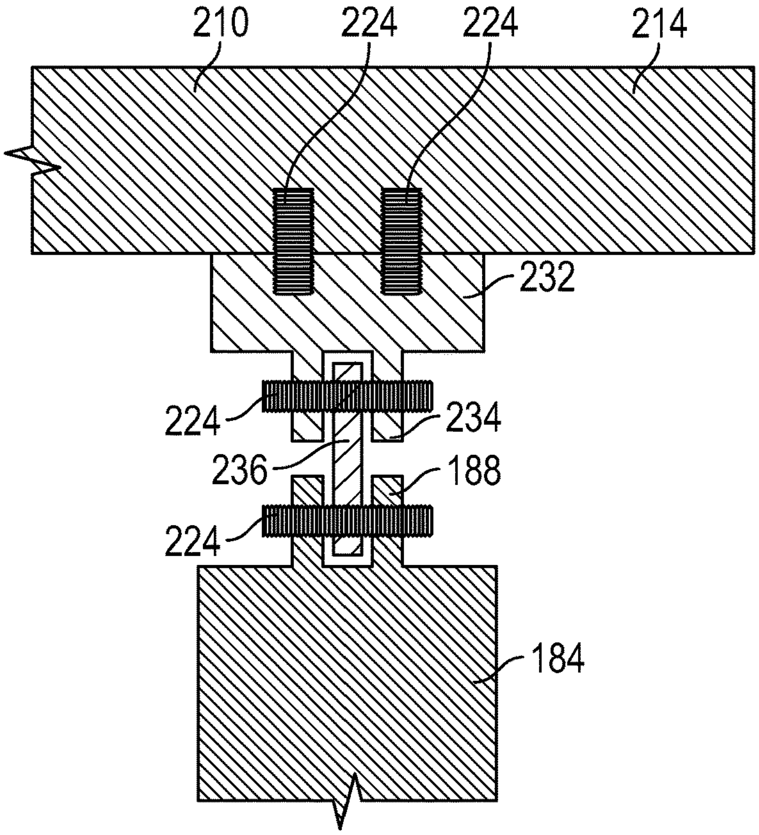
FIG. 5 is a detail cross-sectional view, showing detail 5 in FIG. 3, of an aft mount of the engine mount system shown in FIG. 3.

FIG. 5 is a cross-sectional detail view of the aft mount 230 showing detail 5 in FIG. 3. Although any suitable mount may be used, the aft mount 230 of this embodiment includes a platform 232 attached to an aft section 214 of the engine support structure 210. The platform 232 is attached to the engine support structure 210 using any suitable means including, for example, fasteners. In this embodiment, a plurality of bolts 224 are used to attach the forward mount beam 222 to the engine support structure 210. The platform 232 includes a platform clevis 234 attached to the platform 232. In this embodiment, the platform clevis 234 is integrally formed with the platform 232. The aft frame 184 also includes a clevis, here, a frame clevis 188, which, in this embodiment, is integrally formed with the aft frame 184. The aft frame 184 is connected to the platform 232 by a mount link 236. The mount link 236 may be a rod or a plate having holes formed therein. A bolt 224 is inserted through holes formed in the frame clevis 188 and one of the holes of the mount link 236 to connect the mount link 236 to the aft frame 184, and another bolt 224 is inserted through holes formed in the platform 232 and one of the holes of the mount link 236 to connect the mount link 236 to the platform 232.

Figure 6:
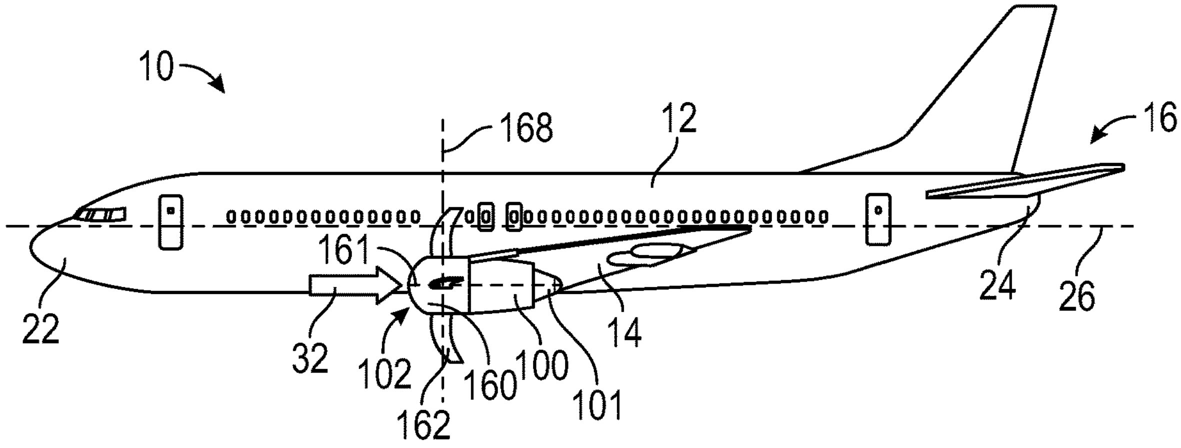
FIG. 6 is a view of the aircraft shown in FIG. 1 during level flight.

The aircraft 10 changes pitch throughout a flight. The pitch of the aircraft 10 may be the angle between the horizon (a horizontal plane) and the centerline 26 of the aircraft 10. The pitch of the aircraft 10 may be small for conditions such as cruise or idle conditions and may be the large for takeoff, climb, and dive. FIG. 6 shows the aircraft 10 during level flight, such as during a cruise condition. The fan blades 162 are rotating about the rotation axis 161 in a plane of rotation 168, and airflow 32 into the fan section 102 is generally perpendicular to the plane of rotation 168 and parallel to the rotation axis 161. In this embodiment, the rotation axis 161 is also parallel to both the longitudinal centerline 101 of the engine 100 and the centerline 26 of the aircraft 10. Accordingly, the airflow 32 is also parallel to the longitudinal centerline 101 of the engine 100 and the centerline 26 of the aircraft 10.

Figure 7:
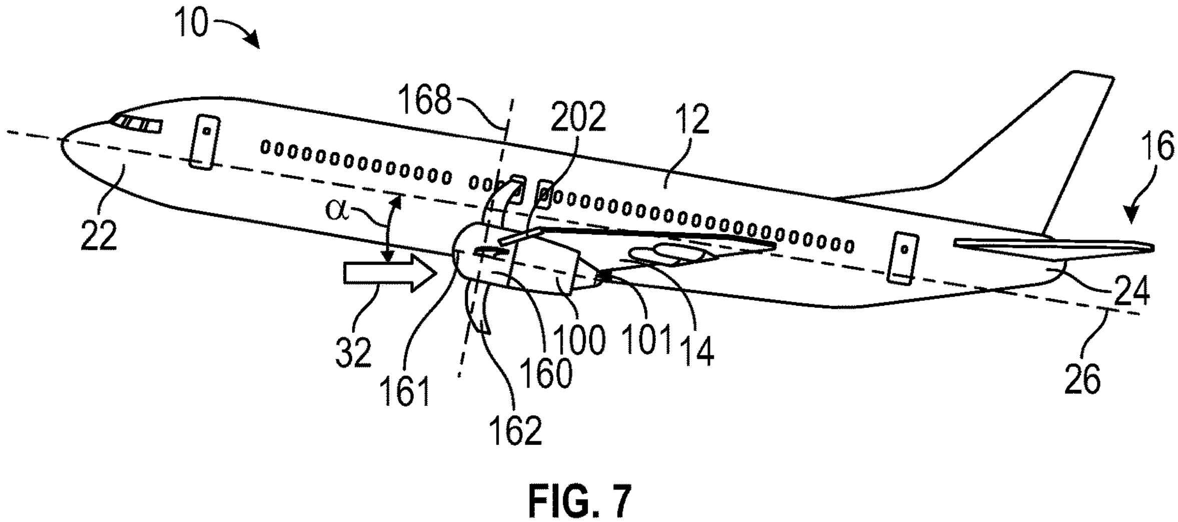
FIG. 7 is a view of the aircraft shown in FIG. 1 for an operating condition when the aircraft is pitched upward.

FIG. 7 shows the aircraft 10 pitched upward, such as during takeoff or a climb condition. When the aircraft 10 has a pitch, such as when the nose 22 is pitched upward during takeoff or a climb condition, the aircraft 10 may have an angle of attack (angle $\alpha$). The angle of attack (AOA) is the angle $\alpha$ between the oncoming air or relative wind (airflow 32) and a reference line on the aircraft 10. In some embodiments, the reference line is a line connecting the leading edge and the trailing edge at some average point on the wing 14. In other embodiments, such as for commercial, passenger aircraft, the centerline 26 may be the reference line. Without changing the plane of rotation 168 and/or the rotation axis 161, the airflow 32 flows into the fan section 102 at an oblique angle relative to both the rotation axis 161 and the plane of rotation 168, giving rise to a 1P loading condition discussed further below with respect to FIG. 8.

Figure 8:
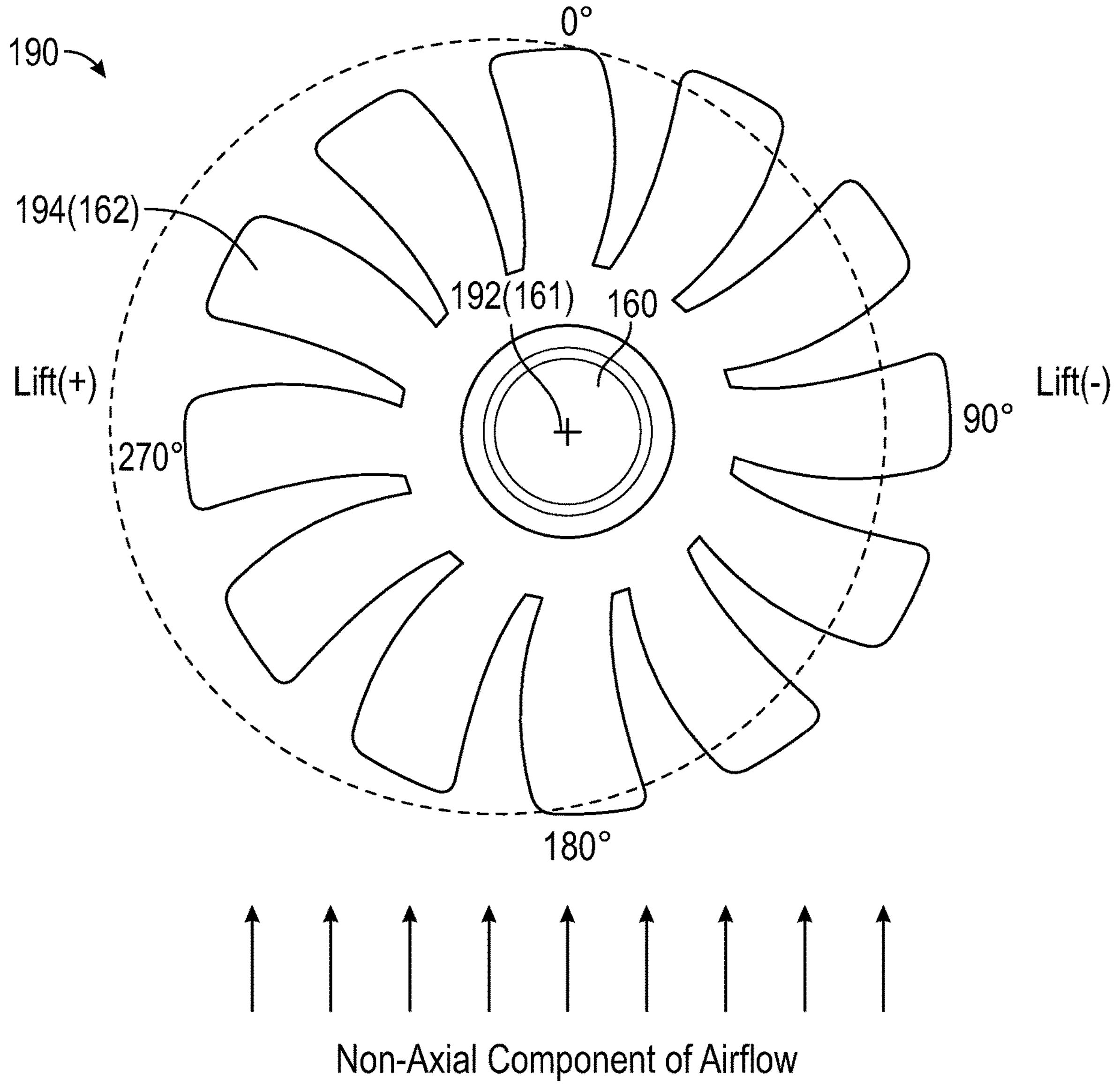
FIG. 8 is a front view of a fan (rotating airfoil assembly) of one of the unducted single fan engines of the aircraft shown in FIG. 1.

FIG. 8 shows a rotating airfoil assembly 190 including a rotating airfoil 194. The rotating airfoil assembly 190 depicted in FIG. 3 is the fan blades 162 and the fan hub 164 of the unducted single fan engine 100 of FIGS. 1 and 2, and FIG. 8 is a front view of the spinner 160. The rotating airfoils 194 (fan blades 162) of the rotating airfoil assembly 190 are rotating in a clockwise direction in FIG. 8 about a rotation axis 192 (rotation axis 161). To aid in the following discussion, angular positions of the rotating airfoil 194 and the rotating airfoil assembly 190 are given relative to the rotation axis 192, as shown in FIG. 8. The rotating airfoil 194 is thus rotating in a downward direction from zero degrees to one hundred eighty degrees and in an upward direction from one hundred eighty degrees to three hundred sixty degrees (zero degrees).

FIG. 8 illustrates the rotation axis 192 being angled (such as pitched upward or downward) relative to the airflow 32 into the rotating airfoil 194. More specifically, in FIG. 8, the rotation axis 192 is angled upward relative to the airflow 32 into the rotating airfoil 194 such as during the condition shown in FIG. 7. In such a condition, the rotating airfoil assembly 190 is subjected to a non-axial component of airflow that is in an upward direction (as depicted by the upward arrows). Each rotating airfoil 194 produces a similar amount of lift at the top (zero degrees) and the bottom (one hundred eighty degrees) of the rotation that the rotating airfoil 194 would produce if the rotating airfoil assembly 190 was not inclined. Each rotating airfoil 194, however, produces less lift when moving downward from the top (zero degrees) to the bottom (one hundred eighty degrees) and more lift when moving upward from the bottom (one hundred eighty degrees) to the top (zero degrees). This change in lift is schematically illustrated by the broken lines in FIG. 8. The lowest amount of lift produced by a rotating airfoil 194 as the rotating airfoil 194 makes one rotation is at ninety degrees, steadily increasing from that point to two hundred seventy degrees before steadily decreasing as the rotating airfoil 194 continues rotating. This may be referred to as once per revolution loading or 1P loading.

Although, as noted above, the rotating airfoil assembly 190 may be various suitable rotating airfoil assemblies 190, the embodiments depicted in the figures show an unducted single fan engine 100 with the rotating airfoil assembly 190 being the fan section 102 and, more specifically, the fan blades 162 and the fan hub 164. Accordingly, the discussion herein makes reference to the unducted single fan engine 100, but this discussion is equally appliable to other rotating airfoil assemblies 190, and to rotating airfoils 194 other than the fan blades 162 and fan hub 164 discussed specifically herein.

Figure 9:
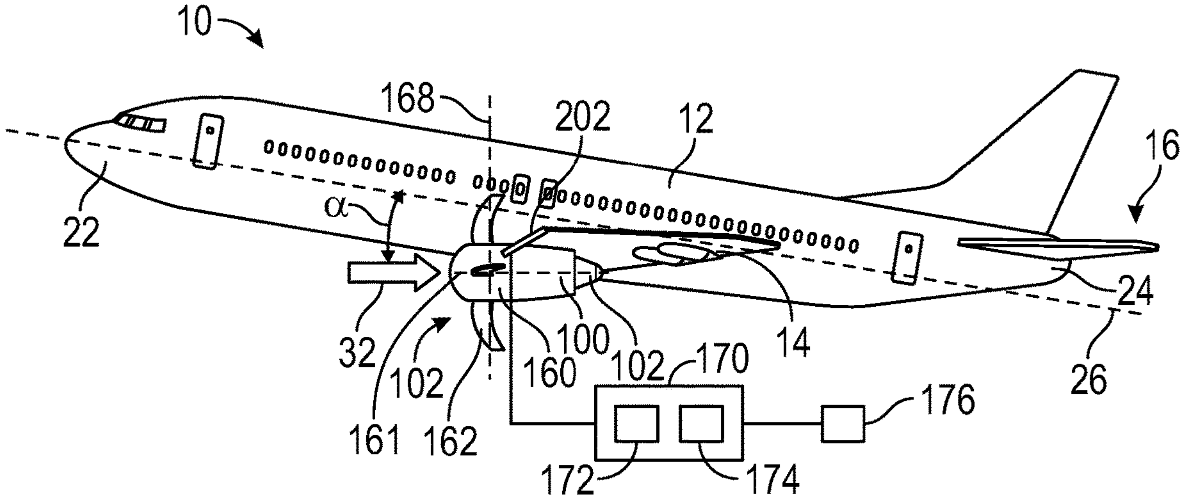
FIG. 9 is a view of the aircraft shown in FIG. 1 for an operating condition when the aircraft is pitched upward and the rotating airfoil assembly is rotated according to an embodiment of the present disclosure.

FIG. 9 shows the aircraft 10 pitched upward, such as during takeoff or a climb condition, with a fan section 102 according to an embodiment. To eliminate the 1P loading condition, the aircraft 10 is configured to change the plane of rotation 168 and, thus, eliminate or reduce the non-axial component of airflow discussed above. In the embodiment depicted in FIG. 9, the engine 100 is rotated to change the plane of rotation 168 such that, even when the aircraft has an angle of attack (angle α), the airflow 32 is generally perpendicular to the plane of rotation 168 and parallel to the rotation axis 161. In some embodiments, such as when the aircraft 10 has a high angle of attack (angle α), the aircraft 10 may change the plane of rotation 168 to a degree such that the airflow 32 still has an oblique angle with the plane of rotation 168, the rotation axis 161, and/or the longitudinal centerline 101 of the engine 100, but the oblique angle and, thus, non-axial component of airflow is reduced.

The engine controller 170 may be configured to receive inputs and to determine from those inputs that the aircraft 10 has an angle of attack (angle α). In some embodiments, the engine controller 170 is configured to receive an input indicating the pitch of the aircraft 10 and determine that the aircraft 10 has an angle of attack (angle α) based on the pitch of the aircraft 10. As discussed above, the engine controller 170 may be directly or indirectly communicatively coupled to a sensor 176, such as a gyroscope or other suitable sensor to determine that the aircraft 10 is pitched upward or downward, and the engine controller 170 is configured to receive an input from the sensor 176 indicating the pitch of the aircraft 10. The sensor 176 may be located on the engine 100 and/or on another portion of the aircraft 10 such as the fuselage 12, a wings 14, and/or the empennage 16. The engine controller 170 may use other inputs from other sensors, such as load cells, strain gauges, pressure sensors, and the like. The aircraft 10 and, more specifically, the engine 100 includes at least one actuator 202 operable to change the plane of rotation 168. The engine controller 170 is operatively coupled to the at least one actuator 202 and configured to operate the at least one actuator 202 to change the plane of rotation 168 based on the angle of attack (angle α). Specific mechanisms for changing the plane of rotation 168 will be discussed further below. In some embodiments, the at least one actuator 202 is configured to adjust (change) the angle of the rotation axis 161. In some of these embodiments, the at least one actuator 202 rotates the entire engine 100 (e.g., rotating the fan section 102 together with the turbomachine 104), but, in other embodiments, the at least one actuator 202 rotates only a portion of the engine 100, such as the fan section 102. In further embodiments, the at least one actuator 202 pivots each fan blade 162 as the fan blade 162 rotates about the rotation axis 161. In the embodiments discussed herein, the rotational movement is in the pitch direction of the aircraft 10.

Figure 10:
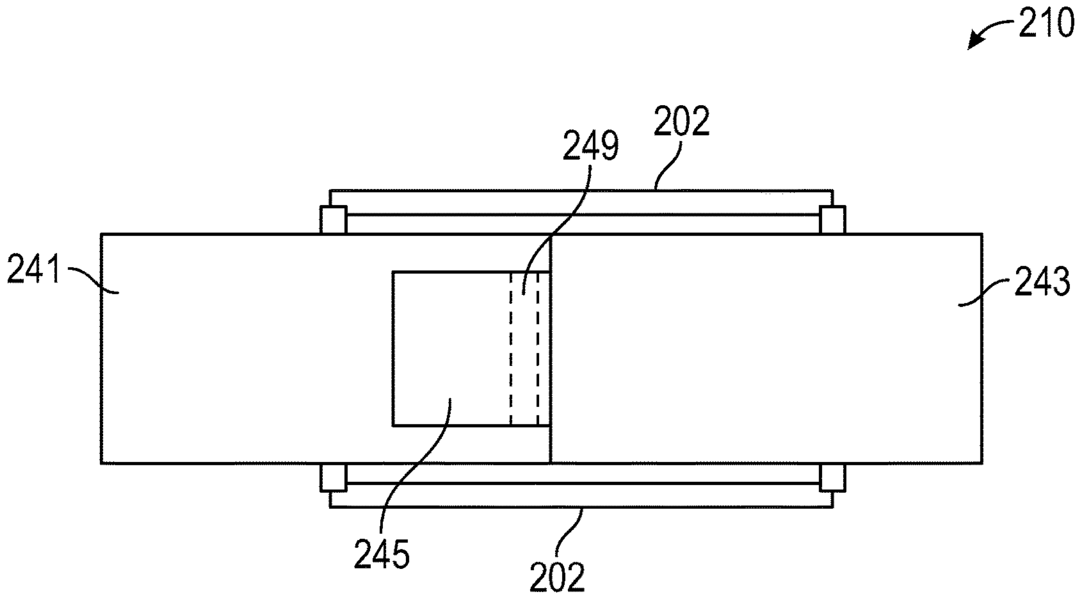
FIG. 10 is a top view of the engine support structure according to an embodiment of the present disclosure.
Figure 11:
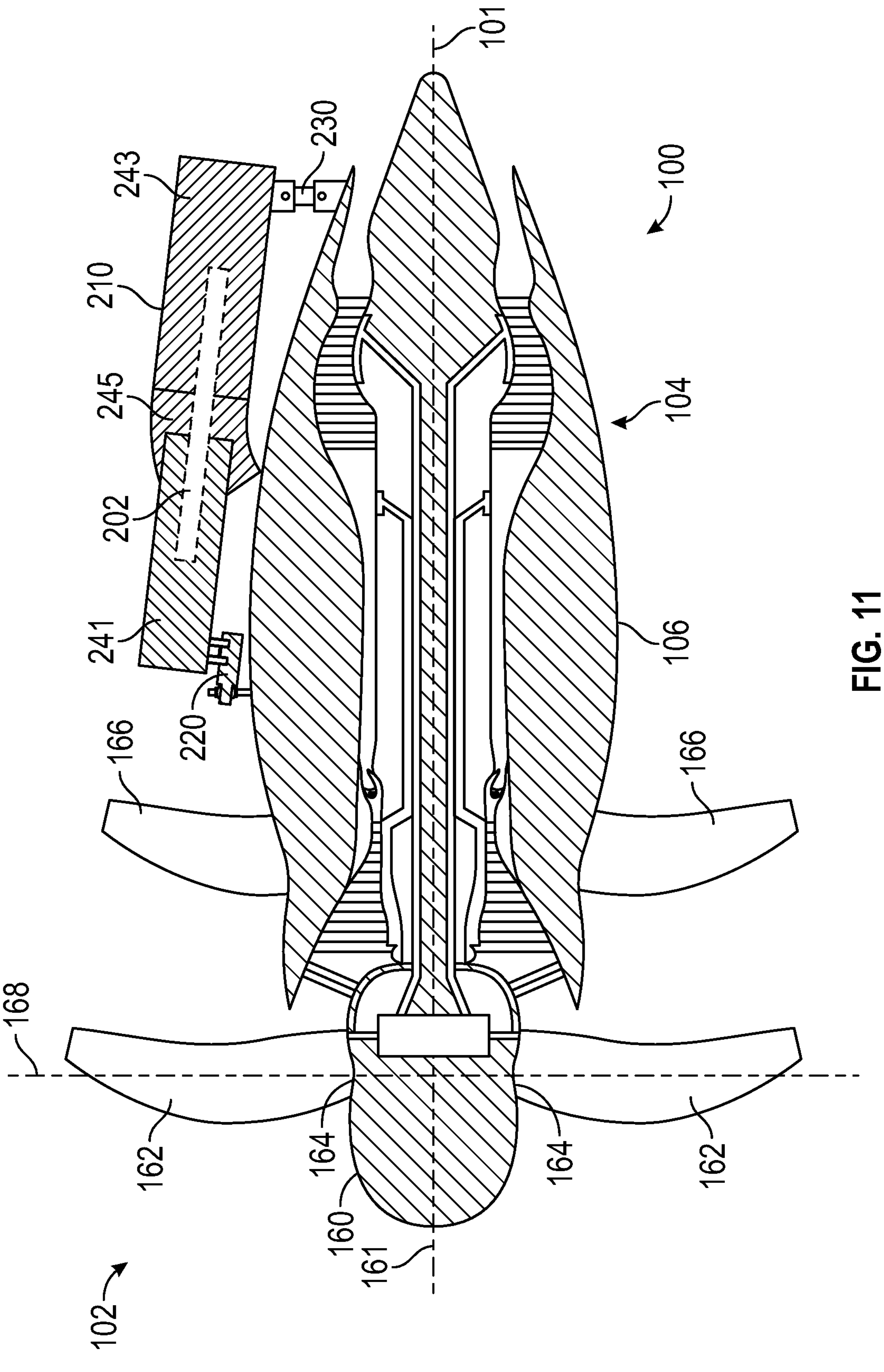
FIG. 11 is a schematic, cross-sectional view, taken along line 2-2 in FIG. 1, of one of the unducted single fan engines of the aircraft shown in FIG. 1, showing the engine support structure of FIG. 10 in a stowed position.
Figure 12:
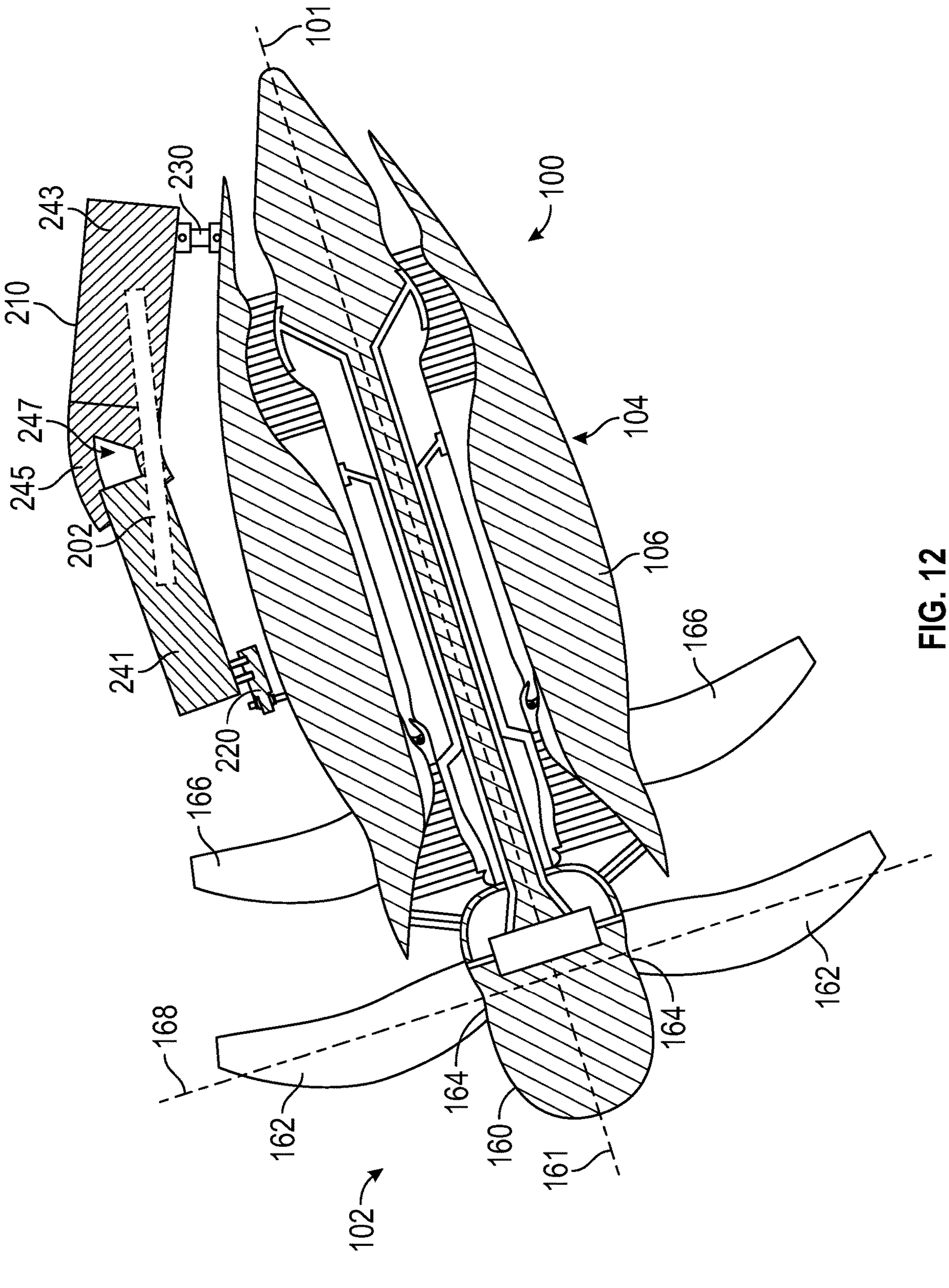
FIG. 12 is a schematic, cross-sectional view, taken along line 2-2 in FIG. 1, of one of the unducted single fan engines of the aircraft shown in FIG. 1, showing the engine support structure of FIG. 10 in a deployed position.

FIGS. 10, 11, and 12 show an engine support structure 210 (pylon 18 of FIG. 1) according to an embodiment. FIG. 10 is a top view of the engine support structure 210 and FIGS. 11 and 12 are schematic, cross-sectional views of the engine 100 and the engine support structure 210 taken along line 2-2 in FIG. 1. The engine support structure 210 of this embodiment is extendable between a stowed position and a deployed position. FIGS. 10 and 11 show the engine support structure 210 in the stowed position, and FIG. 12 shows the engine support structure 210 in the deployed position. The engine support structure 210 of this embodiment includes a forward strut 241 and an aft strut 243. The forward strut 241 is pivotable with respect to the aft strut 243, and the aft strut 243 is stationary remaining connected to the wing 14 (see FIG. 1). At least one actuator 202 and, in this embodiment, two actuators 202 are connected to each of the forward strut 241 and the aft strut 243. The actuator 202 extends in a forward direction and retracts in the aft direction. Extending the actuators 202 from the stowed position moves the forward strut 241 away from the aft strut 243. The actuator 202 may be any suitable actuator, including, for example, linear actuators, such as hydraulic cylinders.

The forward strut 241 and the aft strut 243 are engaged with each other such that, when the actuators 202 are extended, the forward strut 241 also curves and rotates the engine 100 and, thus, the longitudinal centerline 101 about the pitch direction. In this embodiment, a forward portion 245 of the aft strut 243 is curved in a downward direction and includes a curved slot 247. The forward strut 241 includes an engagement strut 249 on an aft portion of the forward strut 241. The engagement strut 249 engages with the curved slot 247 and guides the rotation of the forward strut 241 as the actuators 202 are extended or retracted. Each of the forward mount 220 and the aft mount 230 may be configured to allow for rotation about the pitch axis of the aircraft 10, such as by changing the orientation of the frame clevis 188 (FIG. 5) and platform clevis 234 (FIG. 5) to allow for rotation. With the forward mount 220 attached to the forward strut 241 and the aft mount 230 attached to the aft strut 243, the engine support structure 210 extends to maintain constant the distance between the forward mount 220 and the aft mount 230.

When the aircraft 10 is pitched upward forming an angle of attack (angle α) between the fan blades 162 and the airflow 32 (FIG. 7), the engine controller 170 is configured to extend the actuators 202 and, thereby, pivot the engine 100 and, more specifically, the rotation axis 161 and the longitudinal centerline 101 of the engine 100 downward relative to the centerline 26 of the aircraft 10. Preferably, the engine controller 170 would extend the actuators 202 such that the rotation axis 161 is parallel to the airflow 32 and the plane of rotation 168 is perpendicular to the airflow 32. Accordingly, the fan blades 162 are not subjected to a non-axial component of the airflow 32 and the 1P loading can be eliminated or reduced.

Figure 13:
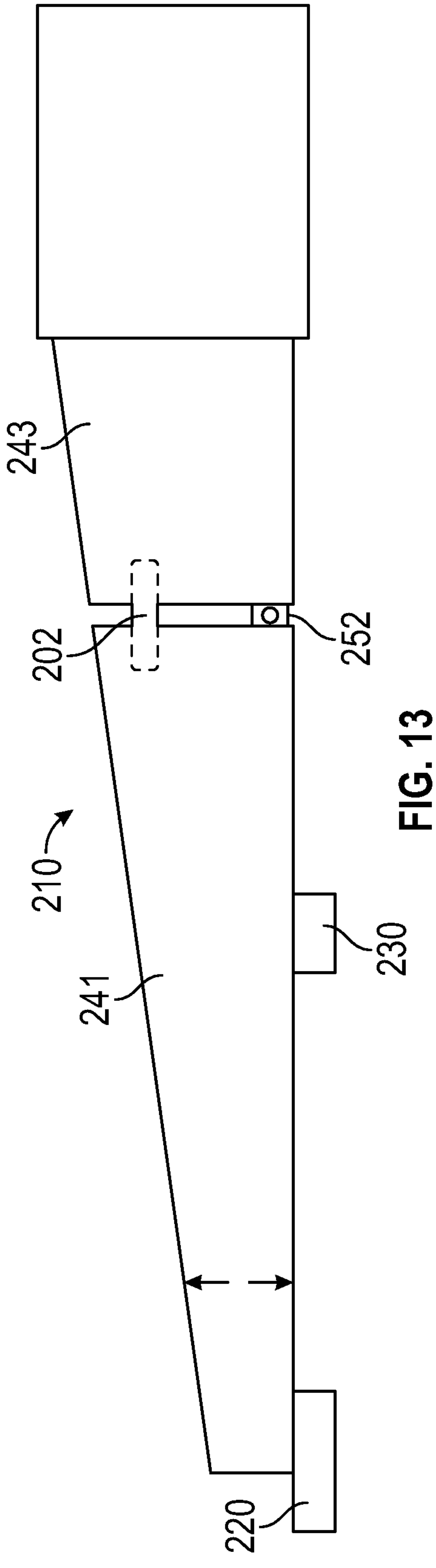
FIG. 13 is a side view of the engine support structure according to an embodiment of the present disclosure.
Figure 14:
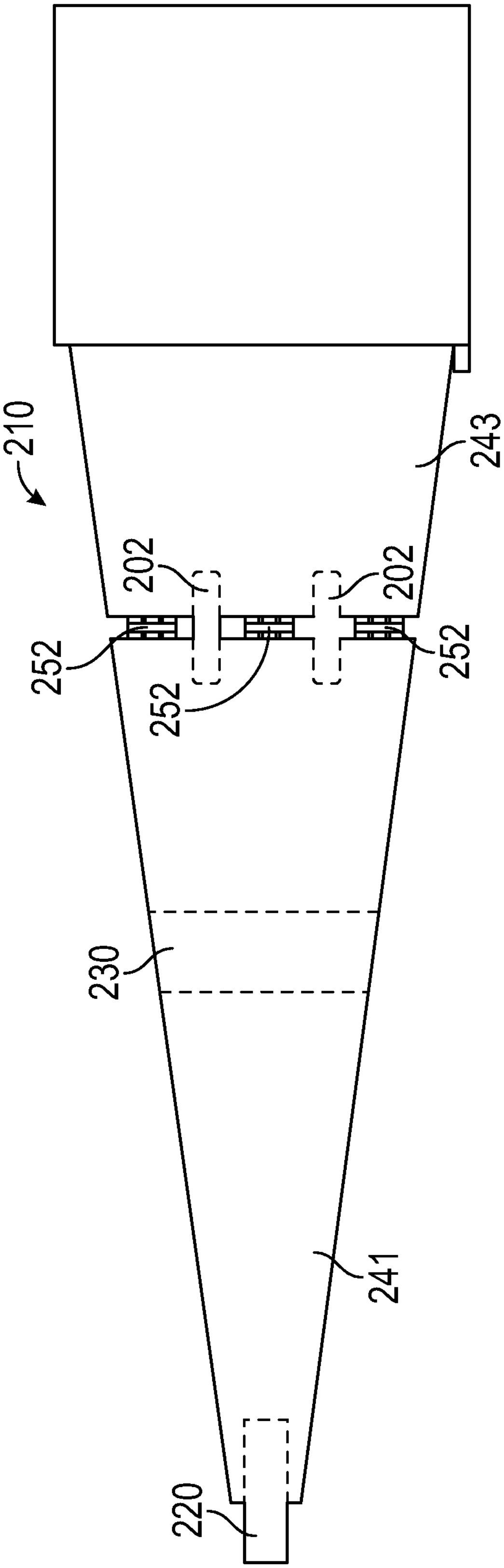
FIG. 14 is a top view of the engine support structure shown in FIG. 13.

FIGS. 13 and 14 show an engine support structure 210 (pylon 18 of FIG. 1) according to another embodiment. FIG. 13 is a side view of the engine support structure 210, and FIG. 14 is a top view of the engine support structure 210. This embodiment, like the embodiment shown in FIGS. 10 to 12, utilizes a two-piece engine support structure 210 with a forward strut 241 and an aft strut 243. The forward strut 241 pivots relative to the aft strut 243 and is, thus, operable to move the engine 100, as discussed above relative to the embodiment shown in FIGS. 10 to 12. In this embodiment, however, both the forward mount 220 and the aft mount 230 are attached to the forward strut 241.

The forward strut 241 is attached to the aft strut 243 by at least one pivot 252. In this embodiment, a plurality of pivots 252 are used. The pivot 252 is located on a lower portion of each of the forward strut 241 and the aft strut 243. At least one actuator 202 is connected to an upper portion of each of the forward strut 241 and the aft strut 243. In this embodiment, a plurality of actuators 202 are used. Extending or retracting the actuators 202 pivots the forward strut 241 about the pivot 252 to change the angle of the engine 100. As discussed above, the actuators 202 may be any suitable actuators, and, in this embodiment, the actuators 202 preferably may be power screws.

Figure 15:
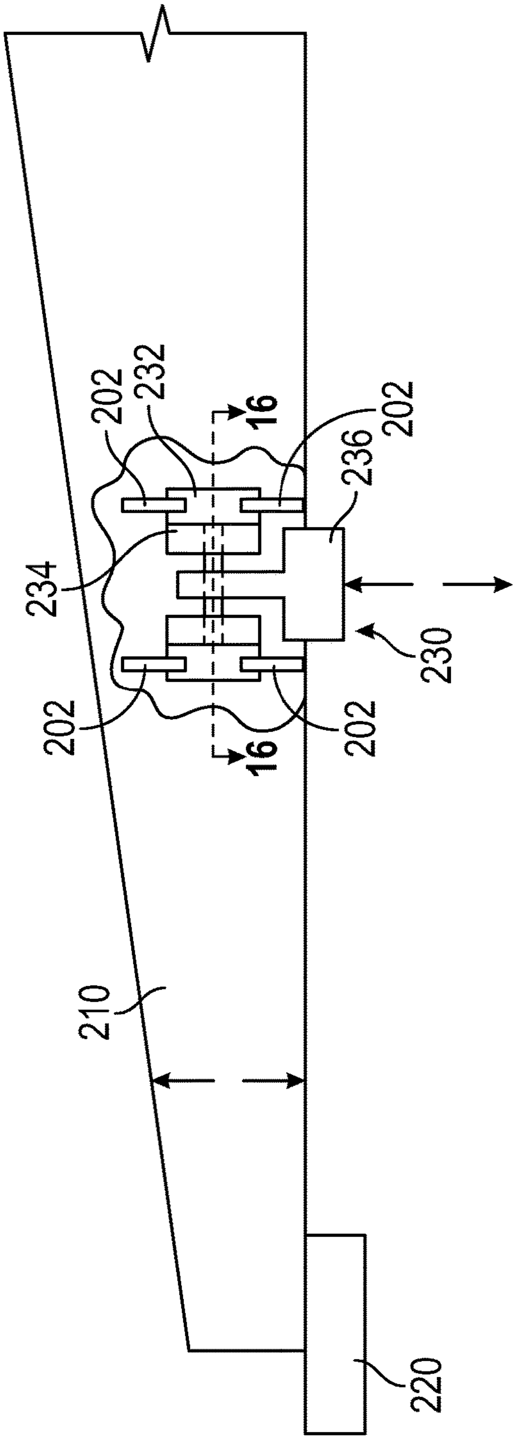
FIG. 15 is a side view of the engine support structure according to an embodiment of the present disclosure.
Figure 17:
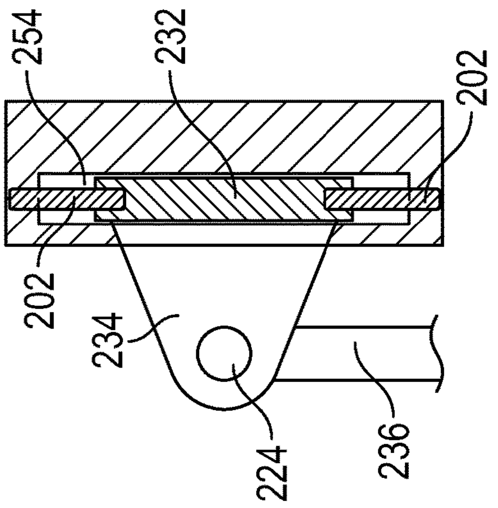
FIG. 17 is a cross-sectional view of the aft mount of the engine support structure shown in FIG. 15, taken along line 17-17 in FIG. 16.
Figure 16:
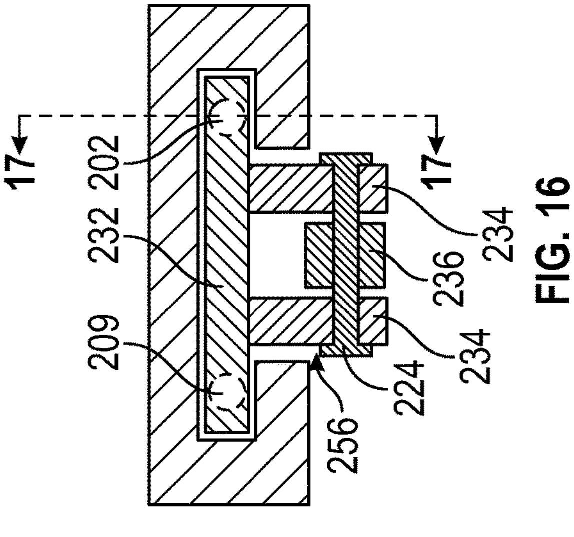
FIG. 16 is a cross-sectional view of an aft mount of the engine support structure shown in FIG. 15, taken along line 16-16 in FIG. 15.

FIGS. 15, 16, and 17 show an engine support structure 210 (pylon 18 of FIG. 1) according to another embodiment. FIG. 15 is a side view of the engine support structure 210. FIG. 16 is a cross-sectional view of the aft mount 230, taken along line 16-16 in FIG. 15, and FIG. 17 is a cross-sectional view of the aft mount 230, taken along line 17-17 in FIG. 16. In the previous embodiments, the engine support structure 210 was movable to pivot the engine 100 and to change the plane of rotation 168 relative to the aircraft 10. In this embodiment, the engine support structure 210 is stationary and at least one of the forward mount 220 and the aft mount 230 is a movable mount that translates up and down to pivot the engine 100 and to change the plane of rotation 168 relative to the aircraft 10, similar to the embodiments discussed above.

In the embodiment shown in FIGS. 15, 16, and 17, the aft mount 230 is movable, and, more specifically, the platform 232 is movable. In this embodiment, the platform 232 is a plate that is oriented in a fore and aft direction and an up and down direction, with a thickness direction that is oriented in an inboard and outboard direction of the aircraft 10. The platform clevis 234 projects outboard (or inboard) in this embodiment. The platform 232 may have other orientations. The platform 232 is movable in an up and down direction, and the platform 232 is positioned within a channel 254 to guide the platform 232 as it moves up and down. The channel 254 includes an opening 256 for the platform clevis 234. A plurality of actuators 202 are used to move the platform 232 up and down. In this embodiment, two actuators 202 are located on an upper side of the platform 232 and two actuators 202 are located on a lower side of the platform 232. Although any suitable actuator 202 may be used, as discussed above, the actuators 202 of this embodiment are preferably power screws. Raising the aft mount 230 (moving the aft mount 230 upward) and, more specifically, the platform 232 raises the aft frame 184 and an aft portion of the engine 100 thereby pivoting the fan section 102 and the plane of rotation 168 downward as shown in FIG. 9. The engine controller 170 may be configured to raise and to lower the aft mount 230 in a manner similar to that discussed above.

Figure 18:
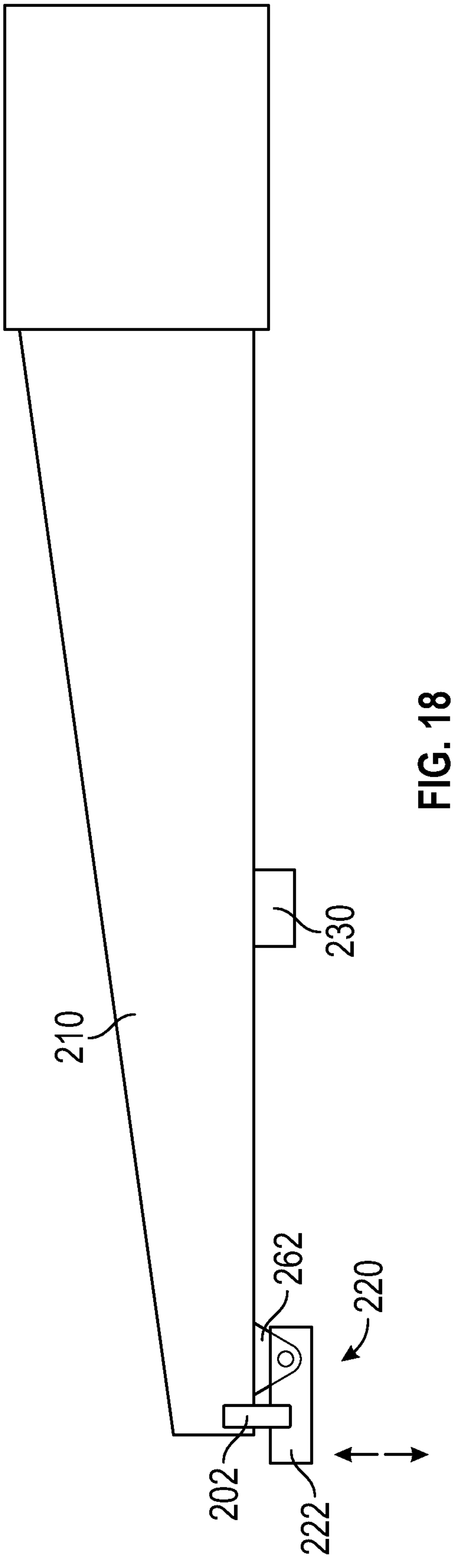
FIG. 18 is a side view of the engine support structure according to an embodiment of the present disclosure.

FIG. 18 shows an engine support structure 210 (pylon 18 of FIG. 1) according to another embodiment. FIG. 18 is a side view of the engine support structure 210. In this embodiment, the forward mount 220 is movable in an up and down direction. The forward mount 220 and, more specifically, the forward mount beam 222, is pivotably attached to the engine support structure 210 by a suitable pivot 262, such as a clevis and a pin connection. At least one actuator 202 is connected to the forward mount beam 222 forward or aft of the pivot 262 to pivot the forward mount beam 222 about the pivot 262. The actuator 202, in this embodiment, is a linear actuator such as a power screw. Pivoting the forward portion of the forward mount 220 and, more specifically, the forward mount beam 222 downward, moves the forward frame 182 (FIG. 4) and a forward portion of the engine 100 downward, thereby pivoting the fan section 102 and the plane of rotation 168 downward as shown in FIG. 9. The engine controller 170 may be configured to pivot the forward mount 220 in a manner similar to that discussed above.

Figure 19:
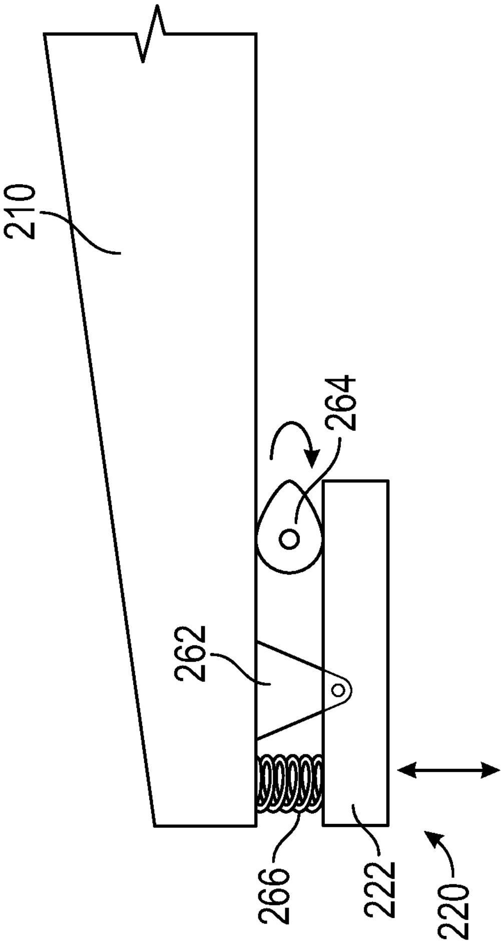
FIG. 19 is a side view of the engine support structure according to an embodiment of the present disclosure.

FIG. 19 shows an engine support structure 210 (pylon 18 of FIG. 1) according to another embodiment. FIG. 19 is a side view of the engine support structure 210. This embodiment is similar to the embodiment discussed above with reference to FIG. 18, but, instead of a linear actuator 202, a rotatable cam, such as a rotatable eccentric cam, 264 is used to pivot the forward mount 220. The rotatable cam 264 may be positioned either forward or aft of the pivot 262 and rotating the rotatable cam 264 rotates the forward portion of the forward mount beam 222. To keep the forward mount beam 222 and the engine support structure 210 in contact with each other, a spring 266 is positioned on an opposite side of the pivot 262 from the rotatable cam 264 in a counterbalance arrangement and applying a biasing (counterbalancing) force to the forward mount beam 222. Although a spring 266 is shown in FIG. 19, other suitable means may be used to apply the biasing (counterbalancing) force, including, for example a spring/damper arrangement.

Figure 20:
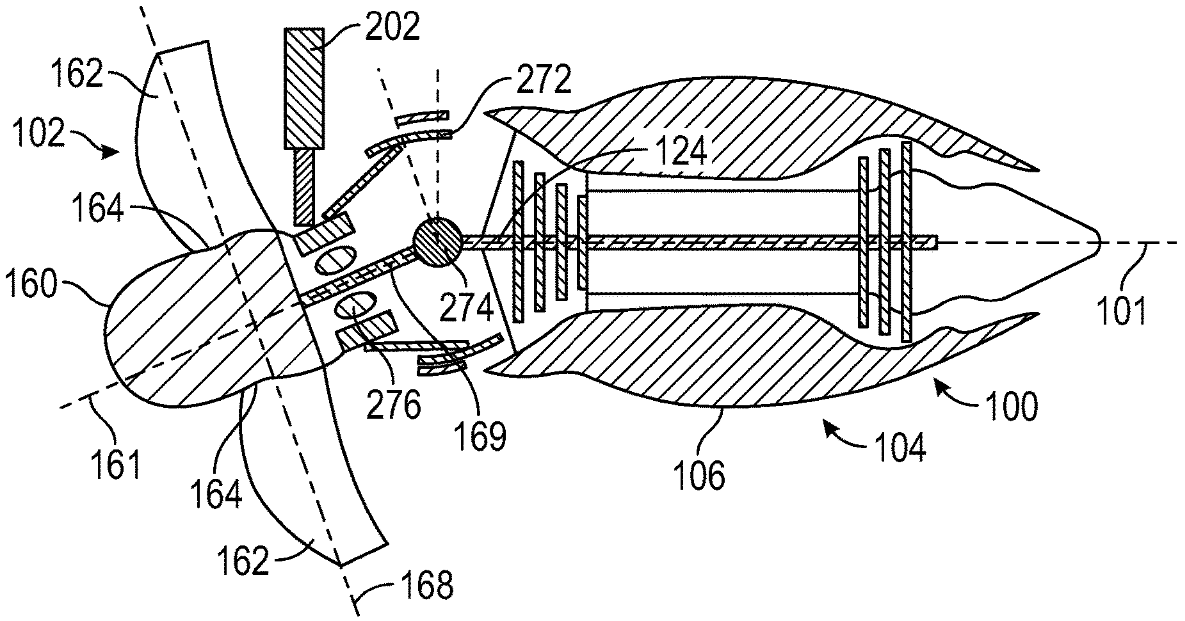
FIG. 20 is a schematic, cross-sectional view of an unducted single fan engine according to an embodiment of the present disclosure. The cross-sectional view is taken from a perspective similar to line 2-2 in FIG. 1.

FIG. 20 is a schematic, cross-sectional view of an engine 100 according to another embodiment. In the embodiments discussed above, the entire engine 100 was rotated to change the engine 100, but, in this embodiment, only a portion of the engine 100 was rotated, specifically, the fan section 102. In this embodiment, the actuator 202 is used to pivot the fan section 102 and, more specifically, the fan blades 162 and the fan hub 164, to rotate the rotation axis 161 and the plane of rotation 168. The engine controller 170 is configured to operate the actuator 202 in a manner similar to those discussed above and the engine controller 170, in conjunction with the actuator 202, is configured to change the pitch of the fan section 102.

The fan section 102, including the spinner 160, the fan blades 162, and the fan hub 164, is pivotably connected to the outer casing 106 of the turbomachine 104. Any suitable pivotable connection may be used such as a curved slot allowing for pitch changes or, as in this embodiment, a spherical joint 272 is used. As discussed above, the fan hub 164 is coupled to the LP shaft 124 of the turbomachine 104, and the LP shaft 124 rotates the fan blades 162 and the fan hub 164. The LP shaft 124 is an example of an output shaft of the turbomachine 104 (torque producing system). The fan hub 164 is connected to a fan shaft 169 in this embodiment, and the LP shaft 124 is connected to the fan hub 164 through a differential gearbox 274. The fan shaft 169 is an example of an input shaft of the rotating airfoil assembly 190. The differential gearbox 274 is centered within the spherical joint 272 and allows the fan shaft 169 to be angled relative to the LP shaft 124 and still receive the rotational driving force from the LP shaft 124. The differential gearbox 274 is an example of a pivotable coupling between the LP shaft 124 and the fan shaft 169 that allows the LP shaft 124 to change pitch relative to the fan shaft 169. The fan shaft 169 may be supported by a barrel bearing 276 to allow for load transfer and also pitch and rotation.

As noted above with respect to FIG. 2, a reduction gearbox 126 may be used to connect the LP shaft 124 with the fan hub 164 and fan blades 162. In the embodiment of FIG. 20, the differential gearbox 274 may be used in place of the reduction gearbox 126 and configured to reduce the input rotational speed from the LP shaft 124 to a speed suitable for rotating the fan hub 164 and fan blades 162.

Alternatively, the differential gearbox 274 may be used in addition to the reduction gearbox 126 and, in such cases, the reduction gearbox 126 may be located between the differential gearbox 274 and the LP shaft 124 in the drive train.

Figure 21:
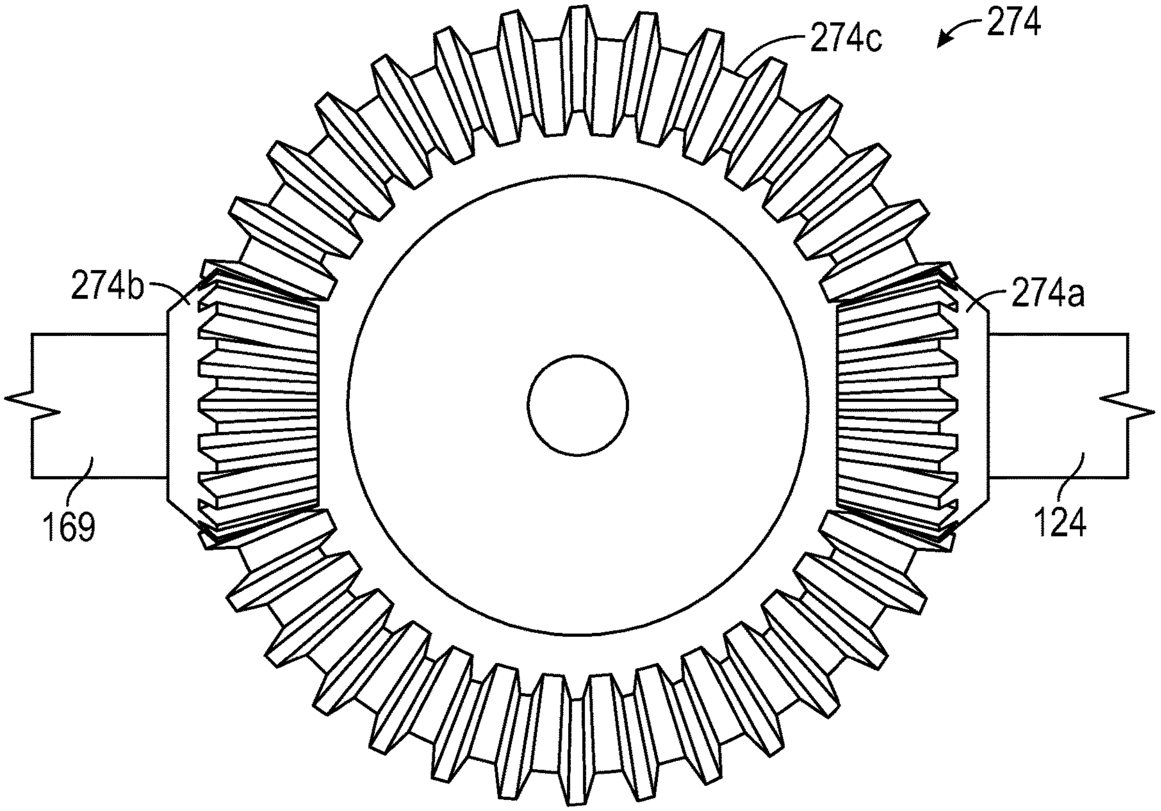
FIG. 21 shows a differential gearbox used in the engine shown in FIG. 20.

FIG. 21 shows the differential gearbox 274 of FIG. 20. The differential gearbox 274 includes an input gear 274*a* connected to the LP shaft 124 and an output gear 274*b* connected to the fan shaft 169. Each of the input gear 274*a* and the output gear 274*b* engages with a pair of transfer gears 274*c* to transfer torque from the input gear 274*a* to the output gear 274*b*. Only one transfer gear 274*c* is shown in FIG. 21 as the other transfer gear 274*c* is removed for clarity. Each transfer gear 274*c* rotates about the same axis and both are positioned to oppose each other on opposite sides of the input gear 274*a* and the output gear 274*b*. The differential gearbox 274 is configured to allow the fan shaft 169 and the output gear 274*b* to rotate and to engage with the transfer gear 274*c* at different radial positions of the transfer gear 274*c*, thereby, allowing the fan section 102 to change angle as discussed above.

Figure 22:
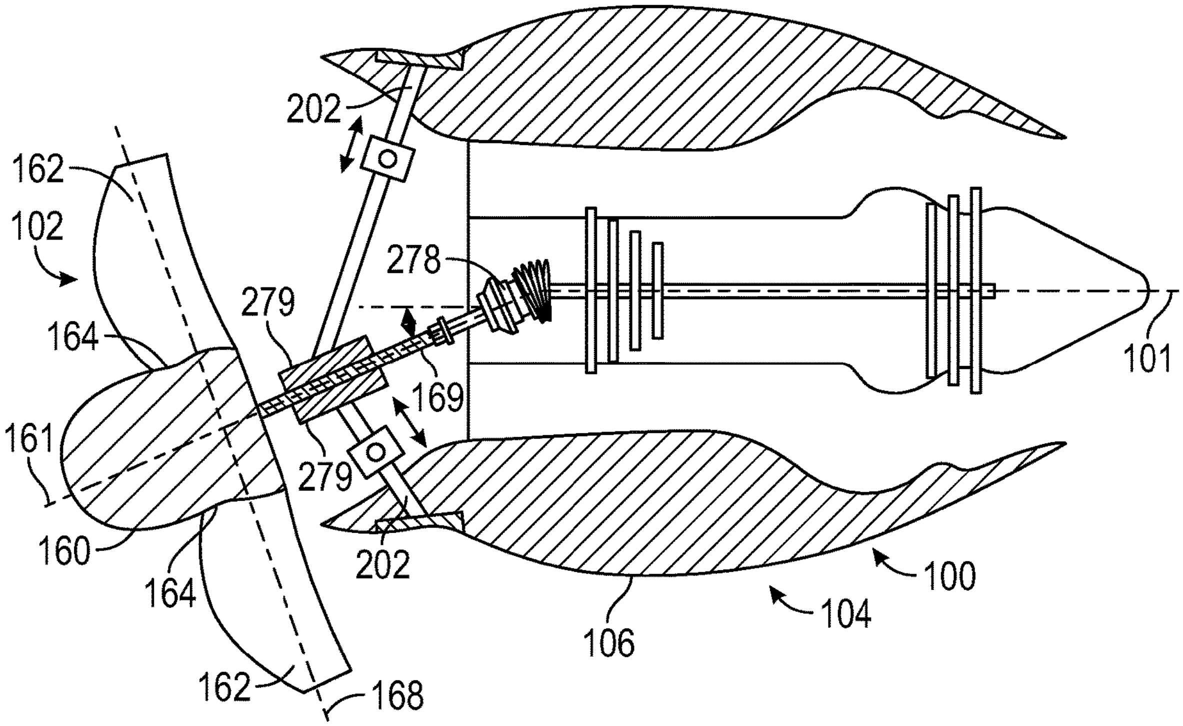
FIG. 22 is a schematic, cross-sectional view of an unducted single fan engine according to an embodiment of the present disclosure. The cross-sectional view is taken from a perspective similar to line 2-2 in FIG. 1.

FIG. 22 is a schematic, cross-sectional view of an engine 100 according to another embodiment. In the embodiment discussed above with reference to FIG. 20, the LP shaft 124 was connected to the fan shaft 169 by a differential gearbox 274, but other suitable connections may be used. In this embodiment, for example, the LP shaft 124 and the fan shaft 169 are connected by a constant velocity (CV) joint 278 instead of a differential gearbox 274. The constant velocity (CV) joint 278 is another example of a pivotable coupling between the LP shaft 124 and the fan shaft 169. The constant velocity (CV) joint 278 allows for power to be transferred from the LP shaft 124 to the fan shaft 169 and accommodates rotation in the pitch direction of the fan section 102. The constant velocity (CV) joint 278 allows for high articulation angles and, thus, can be used to move the fan hub 164 and fan blades 162 over a wide range of angles of attack. The fan shaft 169 may be supported by a bearing such as a spherical bearing 279, as will be discussed further below. In this embodiment, two actuators 202 are shown connected to the spherical bearing 279 to move the fan shaft 169 and thus the fan hub 164 and fan blades 162.

Figure 23:
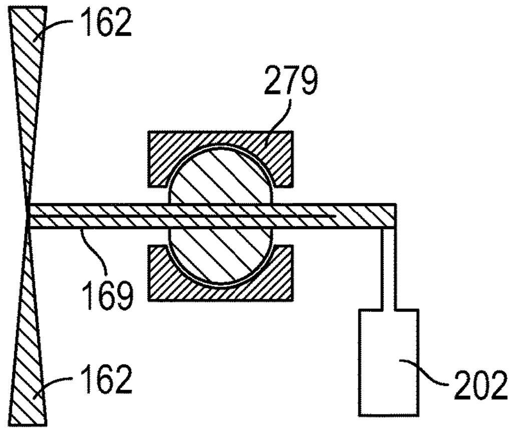
FIG. 23 is a cross-sectional detail view of a spherical bearing supporting a fan shaft.
Figure 24:
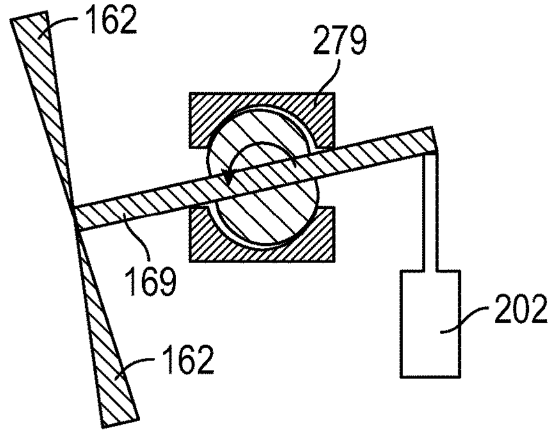
FIG. 24 is a cross-sectional detail view of a spherical bearing supporting a fan shaft, with the fan shaft pivoted.

FIGS. 23 and 24 are cross-sectional detail views showing a spherical bearing 279 supporting the fan shaft 169. In the embodiment shown in FIG. 20 a barrel bearing 276 is used to support the fan shaft 169, but other bearings may be used. A spherical bearing 279, as shown in FIGS. 23 and 24, may be used, for example. The spherical bearing 279 allows for an extra degree of freedom relative to traditional radial bearings. When the fan shaft 169 is moved by the actuator 202, for example, the spherical bearing 279 allows the fan shaft 169 to pivot in the axial direction within the spherical bearing 279, as shown in FIG. 24.

Figure 25:
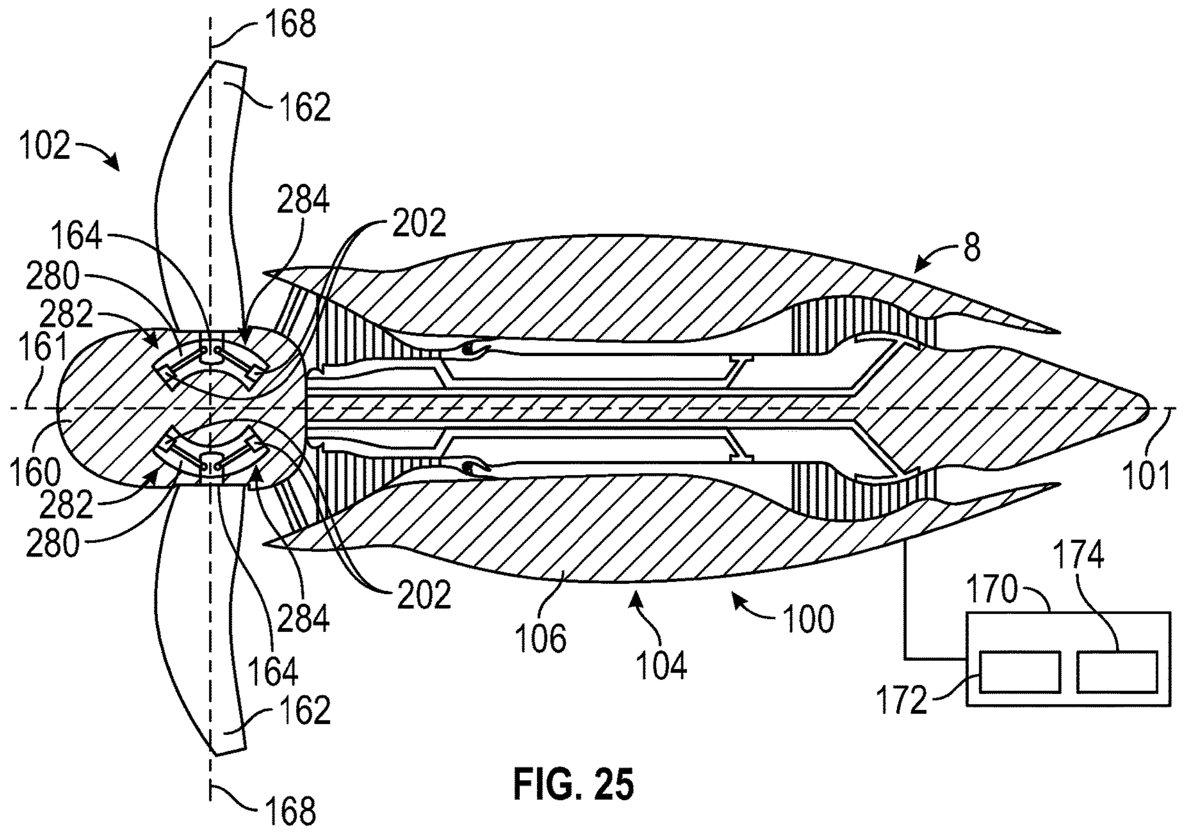
FIG. 25 is a schematic, cross-sectional view of an unducted single fan engine according to an embodiment of the present disclosure during level flight. The cross-sectional view is taken from a perspective similar to line 2-2 in FIG. 1
Figure 26:
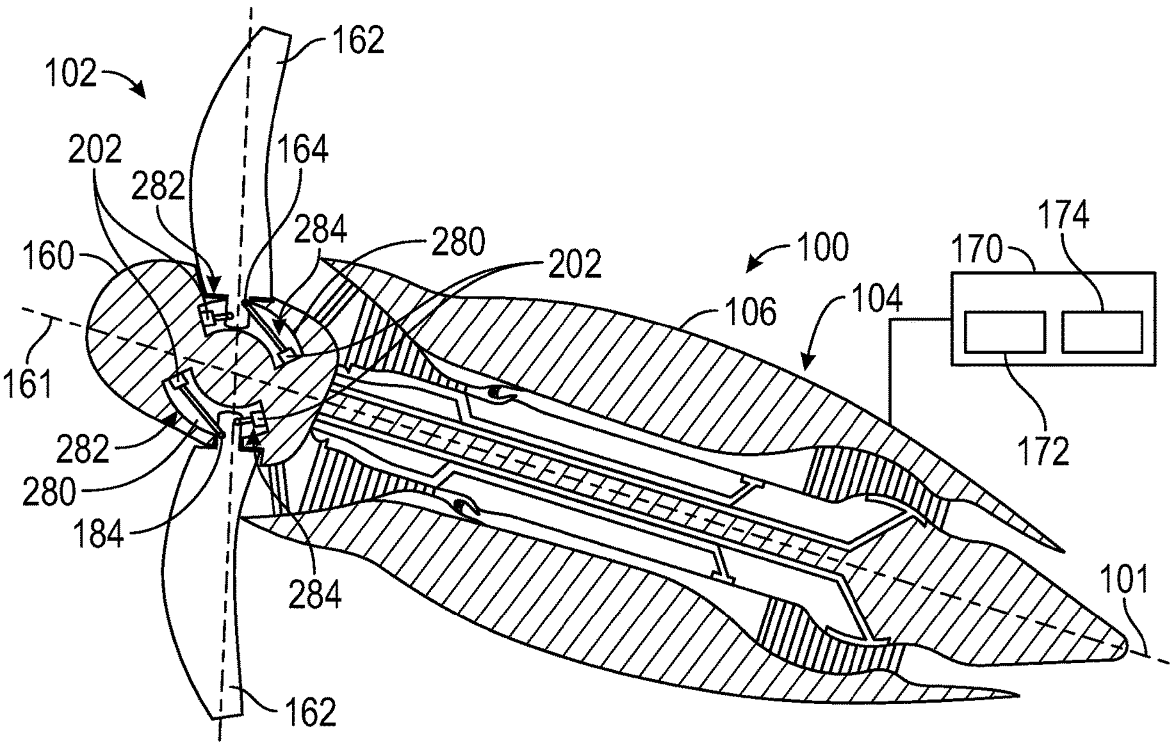
FIG. 26 is a schematic, cross-sectional view of the unducted single fan engine shown in FIG. 25 during the condition shown in FIG. 9.

FIGS. 25 and 26 are schematic, cross-sectional views of an engine 100 according to another embodiment. In the embodiments discussed above, the engine controller 170 is configured to operate the at least one actuator 202 to rotate the engine 100 as a whole, such that the angle of the longitudinal centerline 101 is changed relative to the aircraft 10 or to rotate the fan section 102 such that the rotation axis 161 is changed relative to the aircraft 10 and longitudinal centerline 101. In this embodiment, the engine controller 170 is configured to operate the at least one actuator 202 to change the plane of rotation 168 to have the orientation discussed above, without changing the angle longitudinal centerline 101 or rotation axis 161 with respect to the aircraft 10. Instead, the pitch (as used herein, a forward and aft direction) of each of the fan blades 162 is changed as the fan blades 162 rotate about the rotation axis 161. FIG. 25 shows the engine 100 during level flight, such as in the condition discussed above with respect to FIG. 6, and FIG. 26 shows the engine 100 when the aircraft 10 has an angle of attack such as in the condition discussed above with respect to FIGS. 7 and 8.

In this embodiment, each fan blade 162 is connected to the fan hub 164 with a pivotable connection that allows the fan blade 162 to change pitch. In this embodiment, the pivotable connection includes an arcuate groove 280 and the fan blade 162 is configured to move back and forth within the arcuate groove 280. In this embodiment, each fan blade 162 is connected to a corresponding arcuate groove 280, but other arrangements may be used. The arcuate groove 280 is oriented in the forward and aft direction of the engine 100. At least one actuator 202, and, in this embodiment, two actuators 202 are connected to the fan blade 162 to move the fan blade 162 forward and aft within the arcuate groove 280.

During the condition shown in FIG. 25, the actuators 202 maintain the fan blade 162 at a fixed position as the fan blades 162 rotate about the rotation axis 161, but, in the conditions shown in FIG. 26, the engine controller 170 is configured to operate the actuators 202 to move the fan blades 162, independently, between a forward portion of the arcuate groove 280 and an aft portion of the arcuate groove 280. Each fan blade 162 is located on a forward portion 282 of the arcuate groove 280 when at a twelve o'clock position (zero degrees in FIG. 8), but each fan blade 162 is located on an aft portion 284 of the arcuate groove 280 when at a six o'clock position (one hundred eighty degrees in FIG. 8). The actuators 202 move each fan blade 162 from the forward portion 282 to the aft portion 284 as the fan blade 162 rotates from the twelve o'clock position to the six o'clock position, and the actuators 202 move each fan blade 162 from the aft portion 284 to the forward portion 282 as the fan blade 162 rotates from the six o'clock position to the twelve o'clock position. The engine controller 170 may control the degree of forward and aft movement of each fan blade 162 to maintain a plane of rotation 168 that is perpendicular to the airflow 32.

Figure 27:
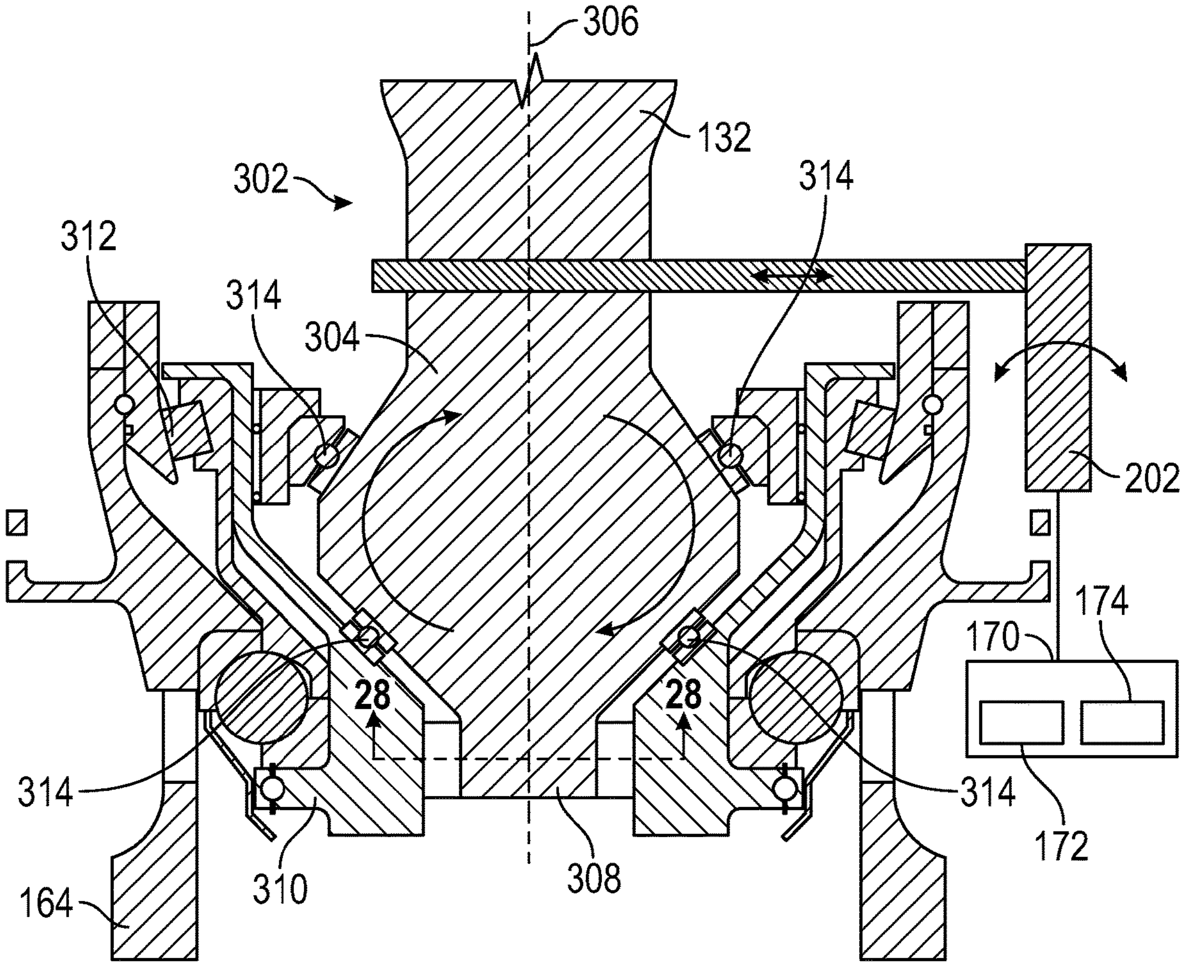
FIG. 27 is a detail cross-sectional view of a fan hub according to another embodiment.

FIG. 27 is a cross-sectional detail view of the fan hub 164 according to another embodiment. In the embodiment discussed above with respect to FIGS. 25 and 26, each fan blade 162 changed pitch with a pivotable connection within an arcuate groove 280. Other suitable pivotable connections may be used, such as the joint shown in FIG. 27. The fan blade 162 includes a root 302 including a bulb 304. The bulb 304 is connected to the fan hub 164 by a trunnion 310, and the trunnion 310 secures the bulb 304.

The fan blade 162 includes a longitudinal axis 306 that extends in the radial direction from the fan hub 164. A plurality of radial bearings 312 connect the trunnion 310 to the fan hub 164 and allow the fan blades 162 to be rotated about the longitudinal axis 306. Such angular rotation of the fan blades 162 is referred to herein as airfoil pitch or airfoil angle of attack to distinguish this movement from movement of the fan blades 162 that is about an axis that is parallel to the pitch axis of the aircraft 10.

In this embodiment, a plurality of spherical bearings 314 connect the trunnion 310 to the bulb 304 and allow the bulb 304 and, thus, the fan blade 162 to change pitch (forward and aft direction of the aircraft 10) in response to movement of at least one actuator 202. The actuator 202 is connected to the root 302 and configured to move the root 302 in a forward and aft direction. The engine controller 170 may be configured to operate the actuator 202 to change the pitch of the fan blades 162 pitch (forward and aft direction of the aircraft 10) in a manner similar to that discussed above with reference to FIG. 26.

Figure 28:
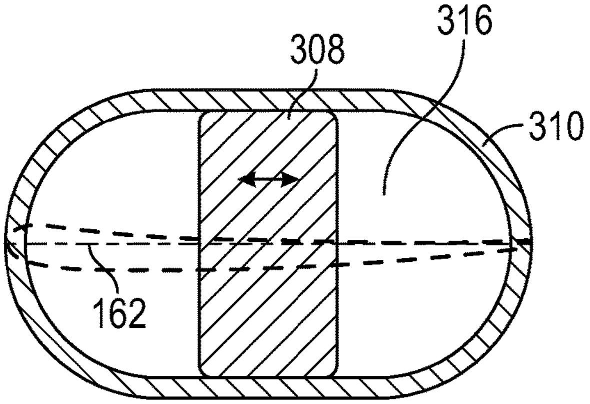
FIG. 28 is a cross-sectional view of the root of the fan blade taken along line 28-28 in FIG. 27.

FIG. 28 is a cross-sectional view of the root 302 of the fan blade 162 taken along line 28-28 in FIG. 27. In this embodiment, an inner portion 308 of the root 302 extends below the bulb 304 and into a slot 316 formed in the trunnion 310. The inner portion 308 is sized relative to the slot 316 to restrict movement in one direction but with a gap permit movement in another (the forward and aft direction).

Figure 29:
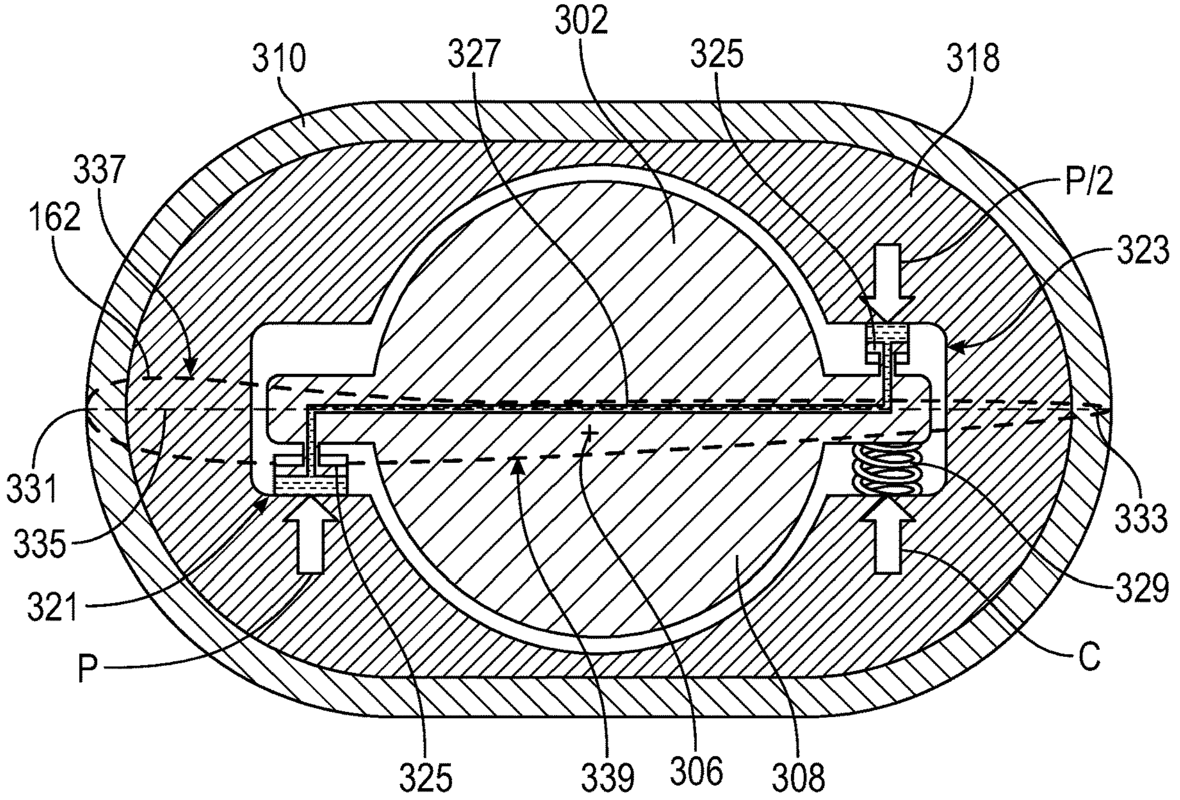
FIG. 29 is a cross-sectional view of the root of the fan blade according to another embodiment.

FIG. 29 is a cross-sectional view of a root 302 of a fan blade 162 according to another embodiment. In the embodiments discussed above, the pitch of the fan blades 162 relative to the pitch axis of the aircraft 10 is actively controlled by the engine controller 170. These active controls may be used on their own or coupled with other approaches to mitigate the 1P loading. In this embodiment, the fan blade 162 is equipped with a spring and damper system 320 that is used to passively adjust the airfoil pitch based on the load applied to the fan blade 162. As noted above, airfoil pitch as used herein is the rotation or angle of the fan blade 162 about the longitudinal axis 306 (see FIG. 27).

The fan blade 162, a top view of which is shown in broken lines in FIG. 29, has a leading edge 331 and a trailing edge 333. A chord 335 of the fan blade 162 extends from the leading edge 331 to the trailing edge 333. The fan blade 162 also includes a suction side and a pressure side, and surfaces of the fan blade 162 are formed on each of the suction side and the pressure side between the leading edge 331 and the trailing edge 333. These surfaces are a suction surface 337 and a pressure surface 339. As can be seen in FIG. 29, the fan blade 162 is a cambered airfoil with the suction surface 337 having a convex curvature and the pressure surface 339 being generally flat. The fan blade 162 may have any suitable shape, however, including, for example, concave surfaces, and the fan blade 162 may be a symmetric airfoil. The suction surface 337 and the pressure surface 339 are positioned on opposite sides of the fan blade 162 such that, when airflows over the suction surface 337 and the pressure surface 339 of the fan blade 162 as the fan blade 162 rotates about the rotation axis 161, the fan blade 162 generates lift (thrust).

The spring and damper system 320 is connected to the root 302 and, more specifically, the inner portion 308 of the root 302. The spring and damper system 320 is configured to impart a force against the root 302 to rotate the root 302 and the fan blade 162 about the longitudinal axis 306, adjusting the airfoil pitch under certain conditions, such as those discussed above. Similar to the embodiment of FIGS. 27 and 28, a trunnion 310 is configured to actively rotate the fan blade 162 and to change the airfoil angle of attack (angle (3, see FIG. 30) as a pitch control mechanism to control the pitch of all of the blades at the same time (up to, for example, forty-five degrees on either side of a neutral position). The trunnion 310 thus may be used to control the amount of thrust produced by the fan section 102. In contrast to the embodiment of FIGS. 27 and 28, the slot 316 includes a bearing 318 that limits the free rotation of the inner portion 308 that is imparted by the spring and damper system 320. The amount of rotation that results from the spring and damper system 320 is limited to a smaller amount, such as ten degrees from the airfoil angle of attack (angle (3) set by the trunnion 310.

The spring and damper system 320 includes a plurality of dampers including a large damper 321 and a small damper 323. In this embodiment, the large damper 321 and the small damper 323 are hydraulic dampers, but any suitable damper may be used, including, for example, pneumatic dampers. Each of the large damper 321 and the small damper 323 is configured to impart a rotational force to the inner portion 308 to rotate the fan blade 162 about the longitudinal axis 306. Each of the large damper 321 and the small damper 323 includes a piston 325. The piston 325 of the small damper 323 has a smaller surface area than the piston 325 of the large damper 321. The large damper 321 and the small damper 323 are fluidly connected to each other by a conduit 327 and, thus, the pressure of the hydraulic fluid in each large damper 321 and the small damper 323 is the same. With the difference in the surface area of the pistons 325, the small damper 323 imparts a lower pressure load (force) than the large damper 321. In the embodiment shown in FIG. 29, the piston 325 of the small damper 323 has half the area of the piston 325 of the large damper 321, and, thus, if the large damper 321 imparts a force (pressure load) P to the inner portion 308, the small damper 323 imparts a force (pressure load) that is one-half P to the inner portion 308.

The large damper 321 and the small damper 323 are positioned on opposite sides of the chord 335, and, in this embodiment, the large damper 321 is positioned on the pressure side and the small damper 323 is positioned on the suction side. The opposite arrangement may also be used with the large damper 321 positioned on the suction side and the small damper 323 positioned on the pressure side. The large damper 321 and the small damper 323 are also positioned on opposite ends of the fan blade 162 (opposite side of inner portion 308) on either side of the longitudinal axis 306. In this embodiment, the large damper 321 is positioned on a forward end closer to the leading edge 331 than the trailing edge 333, and the small damper 323 is positioned on a trailing end closer to the trailing edge 333 than the leading edge 331. Although other arrangements may be used, such as the small damper 323 on the leading end and the large damper 321 on the trailing end. With this arrangement, each of the large damper 321 and the small damper 323 imparts a rotational force to the fan blade 162 in the same direction to change the airfoil pitch. In this embodiment, this rotational force is in a direction that increases the airfoil angle of attack (angle β).

The spring and damper system 320 also includes a spring 329 configured to counterbalance the rotational force imparted by the large damper 321 and the small damper 323. The spring 329 may located at any suitable position to counterbalance the rotational force imparted by the large damper 321 and the small damper 323, but, in this embodiment, the spring 329 is located opposite small damper 323 on the pressure side of the fan blade 162 and on the trailing end of the fan blade 162. The spring 329 is configured to impart a rotational force to the fan shaft (not shown) and, more specifically, the inner portion 308. The rotation direction of the force imparted by the spring 329 is opposite the rotational direction of the large damper 321 and the 323. The spring 329 of this embodiment is a compression spring, but other suitable springs and arrangements may be used.

In FIG. 29, the fan blade 162 is stationary (not rotating), and, in the example shown in FIG. 29, the large damper 321 imparts a force of P to the inner portion 308 and the small damper 323 imparts a force of one-half P to the inner portion 308 for a total rotational force of one and one-half P. As a result, the spring 329 is compressed to a point where the spring force C is equal to one and one-half P.

Figure 30:
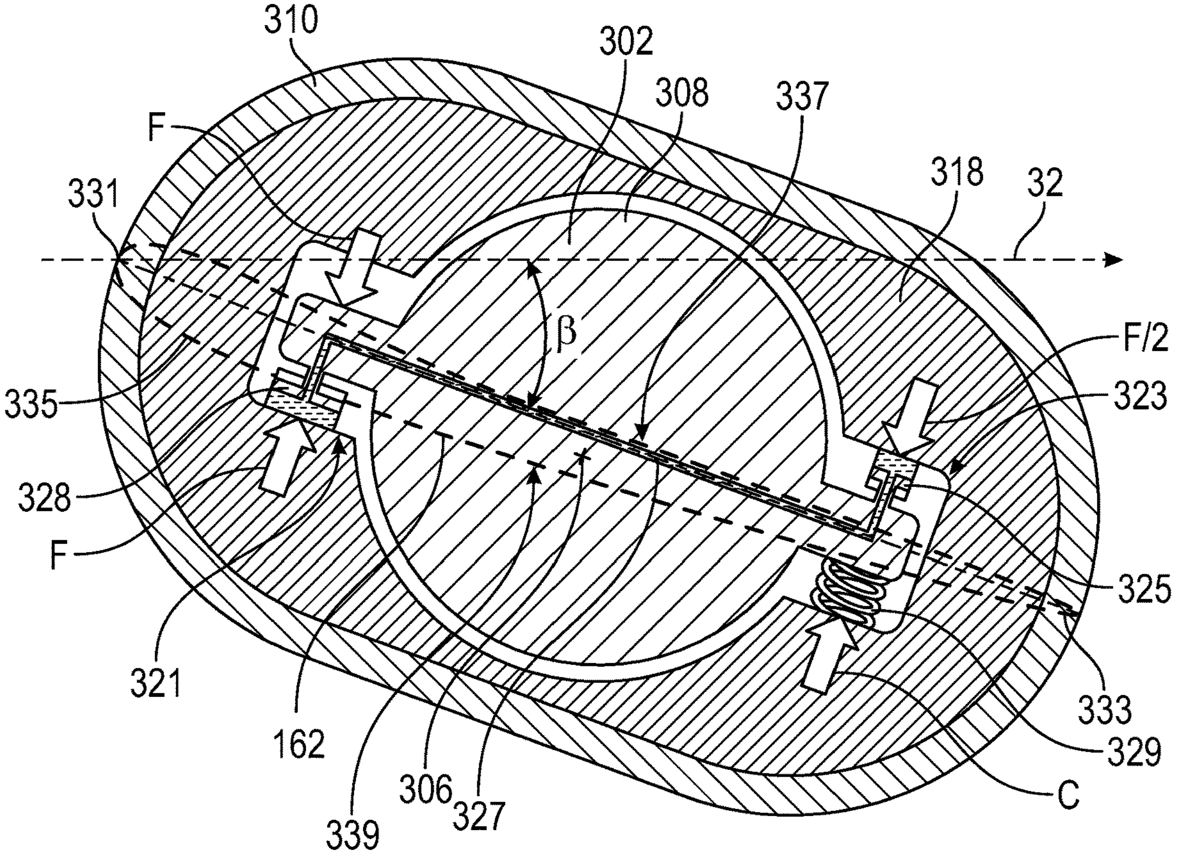
FIG. 30 is the cross-sectional view of the root of the fan blade shown in FIG. 29 in a condition where the fan blade is rotating.

FIG. 30 is a cross-sectional view of the root 302 of the fan blade 162 illustrating a condition where the fan blade 162 is rotating about the rotation axis 161. The fan blade 162 has an airfoil angle of attack (angle β) with the airflow 32. As the fan blade 162 rotates, the fan blade 162 produces a thrust with a resultant force F on the fan blade 162. The pressure in the large damper 321 adjusts to balance the force F on the fan blade 162 from the thrust. The small damper 323 thus imparts a rotational force of one-half F on the fan blade 162, and the fan blade 162 rotates to an airfoil pitch where the spring force counterbalances the force of one-half F. In a condition when the aircraft 10 is flying level, such as the condition shown above in FIG. 6, the thrust and resultant force F is constant through one rotation of the fan blade 162.

In a condition when the there is a non-axial component of airflow, such as shown in FIG. 7 above, the thrust and resultant force F will change as the fan blade 162 rotates. As the fan blade 162 moves through portions of the rotation where resultant force F increases, the small damper 323 will also impart an additional force to the inner portion 308 and rotate the fan blade 162 in a direction to increase the airfoil angle of attack (angle β). When the airfoil angle of attack (angle β) increases, the thrust produced by the fan blade 162 decreases. As the fan blade 162 moves through portions of the rotation where resultant force F decreases, the small damper 323 will imparts less force to the inner portion 308, and the spring 329 rotates the fan blade 162 in a direction to decrease the airfoil angle of attack (angle β). When the airfoil angle of attack (angle β) decreases, the thrust produced by the fan blade 162 increases. In this way, the cyclic load on the fan blade 162 can be reduced as shown in FIG. 31.

Figure 31:
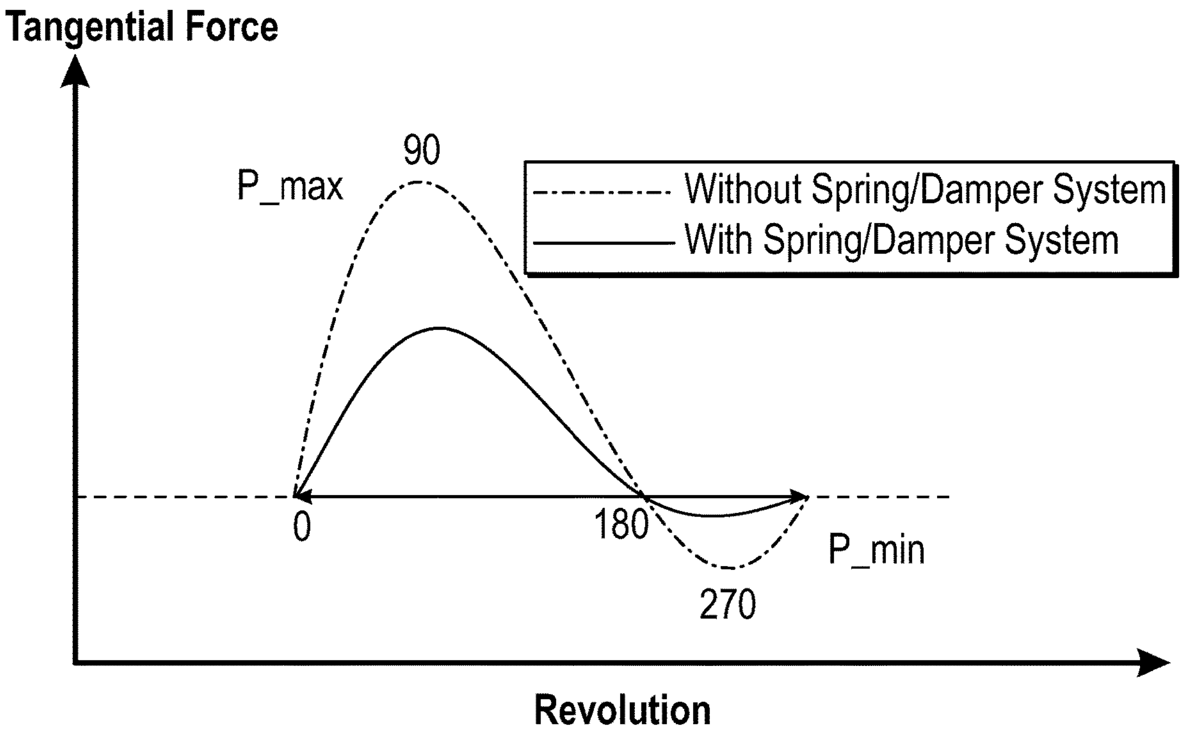
FIG. 31 is a graph illustrating the effects of a spring damper system for the fan blade shown in FIG. 30.

FIG. 31 shows the load on the fan blade 162 as the fan blade 162 rotates through one revolution in a condition shown in FIG. 8. The broken line illustrates one rotation of a fan blade 162 without the spring and damper system 320 and the solid line illustrates one rotation of a fan blade 162 with the spring and damper system 320. As can be seen in FIG. 31, the use of the spring and damper system 320 reduces the cyclic loading on the fan blade 162.

The embodiments discussed herein reduce the magnitude of the asymmetric load produced by the rotating airfoils or even eliminate the asymmetric load when the aircraft has an angle of attack. Further aspects of the present disclosure are provided by the subject matter of the following clauses.

An airfoil structure includes an airfoil and a spring and damper system. The airfoil includes a longitudinal axis, and the spring and damper system is connected to the airfoil to rotate the airfoil about the longitudinal axis to change airfoil pitch in response to a load applied to the airfoil.

The airfoil structure of the preceding clause, wherein the spring and damper system includes a plurality of dampers. Each damper of the plurality of dampers are fluidly connected to each other and configured to impart a rotational force to the rotating airfoil in a first direction.

The airfoil structure of any preceding clause, wherein each damper of the plurality of dampers is a hydraulic damper.

The airfoil structure of any preceding clause, wherein the spring and damper system includes a spring configured to counterbalance the rotational force imparted by the plurality of dampers.

The airfoil structure of any preceding clause, wherein the airfoil further includes a root, and the plurality of dampers and the spring are connected to the root to impart the rotational force to the root.

The airfoil structure of any preceding clause, further comprising a trunnion including a bearing. The root includes a bulb secured in the trunnion by the bearing to allow rotation of the bulb about the longitudinal axis.

The airfoil structure of any preceding clause, wherein the root includes an inner portion extending below the bulb and into a slot formed in the trunnion. The plurality of dampers and the spring are connected to the inner portion of the root.

The airfoil structure of any preceding clause, wherein each damper of the plurality of dampers includes a piston. The plurality of dampers includes a large damper and a small damper. The piston of the small damper has a smaller surface area than the piston of the large damper.

The airfoil structure of any preceding clause, wherein the small damper imparts a smaller pressure load to the airfoil than the large damper.

The airfoil structure of any preceding clause, wherein the airfoil further includes a leading edge, a trailing edge, and a chord extending from the leading edge to the trailing edge. The large damper and the small damper are positioned on opposite sides of the chord.

The airfoil structure of any preceding clause, wherein the spring and damper system includes a spring configured to counterbalance the rotational force imparted by the plurality of dampers. The spring is positioned on the same side of the chord as the large damper.

The airfoil structure of any preceding clause, wherein the airfoil further includes a pressure side and a suction side. The large damper is positioned on the pressure side and the small damper is positioned on the suction side.

The airfoil structure of any preceding clause, wherein the spring and damper system includes a spring configured to counterbalance the rotational force imparted by the plurality of dampers. The spring is positioned on the pressure side.

The airfoil structure of any preceding clause, wherein the large damper and the small damper are positioned on opposite sides of the longitudinal axis.

The airfoil structure of any preceding clause, wherein the spring and damper system includes a spring configured to counterbalance the rotational force imparted by the plurality of dampers. The spring is positioned on the same side of the longitudinal axis as the small damper.

The airfoil structure of any preceding clause, wherein the airfoil further includes a leading edge and a trailing edge. The large damper is positioned on a forward end closer to the leading edge than the trailing edge. The small damper is positioned on a trailing end closer to the trailing edge than the leading edge.

The airfoil structure of any preceding clause, wherein the spring and damper system includes a spring configured to counterbalance the rotational force imparted by the plurality of dampers. The spring is positioned on the trailing end.

A rotating airfoil assembly comprising a plurality of the airfoil structures any preceding clause, the plurality of the airfoil structures being rotatable about a rotation axis of the rotating airfoil assembly.

The rotating airfoil assembly of the preceding clause, wherein the airfoil includes a leading edge, a trailing edge, a suction surface between the leading edge and the trailing edge, and a pressure surface between the leading edge and the trailing edge, the suction surface and the pressure surface being positioned on opposite sides of the airfoil such that, when air flows over the suction surface and the pressure surface of the airfoil as the airfoil rotates about the rotation axis, the airfoil generates lift, the load applied to the airfoil being the generated lift.

An engine comprises the rotating airfoil assembly of any preceding clause and a torque producing system. The torque producing system is coupled to the rotating airfoil assembly and configured to rotate the rotating airfoil assembly about the rotation axis of the rotating airfoil assembly.

The engine of any preceding clause, wherein the engine is an unducted single fan engine. The torque producing system is a turbomachine of a gas turbine engine. The rotating airfoil assembly is a fan. Each of the plurality of rotating airfoils are fan blades.

An engine for an aircraft comprises a rotating airfoil assembly, at least one actuator, a torque producing system, and a controller. The rotating airfoil assembly includes a rotation axis and a plurality of rotating airfoils configured to rotate about the rotation axis in a plane of rotation. The at least one actuator is operable to change the plane of rotation of the plurality of rotating airfoils. The torque producing system is coupled to the rotating airfoil assembly and configured to rotate the rotating airfoil assembly about the rotation axis of the rotating airfoil assembly. The controller is configured to determine that the aircraft has an angle of attack and to operate the at least one actuator to change the plane of rotation of the plurality of rotating airfoils based on the angle of attack.

The engine of the preceding clause, wherein the controller is configured to receive an input indicating a pitch of the aircraft. The controller determines that the aircraft has an angle of attack based on the pitch of the aircraft.

The engine of any preceding clause, wherein the controller is communicatively coupled to a sensor to receive an input from the sensor. The controller determines that the aircraft has an angle of attack based on the pitch of the aircraft.

The engine of any preceding clause, further comprising the sensor.

The engine of any preceding clause, wherein the engine is an unducted single fan engine. The torque producing system is a turbomachine of a gas turbine engine. The rotating airfoil assembly is a fan. Each of the plurality of rotating airfoils are fan blades.

The engine of any preceding clause, wherein the at least one actuator is a linear actuator.

The engine of any preceding clause, wherein the at least one actuator is a hydraulic cylinder.

The engine of any preceding clause, wherein the at least one actuator is a power screw.

The engine of any preceding clause, wherein the at least one actuator changes the plane of rotation of the plurality of rotating airfoils by pivoting each rotating airfoil as the rotating airfoil rotates about the rotation axis.

The engine of any preceding clause, wherein the rotating airfoil assembly includes a hub. Each rotating airfoil is pivotably connected to the hub by an arcuate groove. The at least one actuator is configured to change the plane of rotation of the plurality by moving each rotating airfoil within the arcuate groove.

The engine of any preceding clause, wherein the rotating airfoil assembly includes a hub. Each rotating airfoil is pivotably connected to the hub by a trunnion. Each rotating airfoil is secured within the trunnion by a spherical bearing. The at least one actuator is configured to change the plane of rotation of the plurality by moving each rotating airfoil.

The engine of any preceding clause, wherein the at least one actuator changes the plane of rotation of the plurality of rotating airfoils by rotating the rotating airfoil assembly.

The engine of any preceding clause, wherein the torque producing system includes an output shaft. The rotating airfoil assembly includes a shaft coupled to the output shaft to receive torque from the output shaft and to rotate the rotating airfoil assembly.

The engine of any preceding clause, wherein the shaft of the rotating airfoil assembly is supported by a spherical bearing.

The engine of any preceding clause, wherein the shaft of the rotating airfoil assembly is connected to the output shaft of the torque producing system by a differential gearbox. The differential gearbox is configured to allow the shaft of the rotating airfoil assembly to rotate relative to the output shaft.

The engine of any preceding clause, wherein the shaft of the rotating airfoil assembly is connected to the output shaft of the torque producing system by a constant velocity joint. The constant velocity joint is configured to allow the shaft of the rotating airfoil assembly to rotate relative to the output shaft.

The engine of any preceding clause, wherein the at least one actuator changes the plane of rotation of the plurality of rotating airfoils by rotating the rotating airfoil assembly together with the torque producing system.

The engine of any preceding clause, further comprising an engine support structure. The engine support structure is connected to the torque producing system by a plurality of mounts. At least one mount of the plurality of mounts is a movable mount. The at least one actuator is configured to move the movable mount to rotate the torque producing system.

The engine of any preceding clause, wherein the at least one actuator is configured to translate the movable mount.

The engine of any preceding clause, wherein the movable mount is connected to the engine support structure by a pivot. The at least one actuator is configured to move the movable mount by rotating the movable mount about the pivot.

The engine of any preceding clause, wherein the at least one actuator is a cam. The cam is positioned on one side of the pivot. A spring is positioned on the other side of the pivot to counterbalance the cam.

The engine of any preceding clause, further comprising an engine support structure. The engine support structure includes a forward strut and an aft strut. The at least one actuator is configured to move the forward strut relative to the aft strut to rotate the torque producing system.

The engine of any preceding clause, wherein the engine support structure is connected to the torque producing system by a plurality of mounts. The plurality of mounts is connected to the forward strut.

The engine of any preceding clause, wherein the engine support structure is connected to the torque producing system by a forward mount and an aft mount. The forward mount is connected to the forward strut. The aft mount is connected to the aft strut. The at least one actuator is configured to move the forward strut away from the aft strut to rotate the torque producing system.

A mounting system for an aircraft engine including an engine support structure, a plurality of mounts, and at least one actuator. The plurality of mounts attached to the engine support structure to couple the aircraft engine to the engine support structure. At least one mount of the plurality of mounts being a movable mount. The at least one actuator operable to move the movable mount.

The mounting system of the previous clause, wherein the engine support structure includes a channel. The movable mount is movable within the channel and the channel guiding the movement of the movable mount.

The mounting system of any preceding clause, wherein the at least one actuator is configured to translate the movable mount.

The mounting system of any preceding clause, wherein the movable mount is translatable in an up and down direction and the at least one actuator is configured to translate the movable mount in the up and down direction.

The mounting system of any preceding clause, wherein the movable mount includes a platform. The at least one actuator is connected to the platform.

The mounting system of any preceding clause, wherein the at least one actuator is a power screw.

The mounting system of any preceding clause, wherein the movable mount includes a platform clevis attached to the platform.

The mounting system of any preceding clause, further comprising a plurality of the at least one actuator.

The mounting system of any preceding clause, wherein the plurality of the at least one actuator is located on an upper side of the platform.

The mounting system of any preceding clause, wherein the plurality of the at least one actuator is located on a lower side of the platform.

The mounting system of any preceding clause, wherein at least one of the plurality of the at least one actuator is located on an upper side of the platform, and at least one of the plurality of the at least one actuator is located on a lower side of the platform.

The mounting system of any preceding clause, wherein the movable mount includes a beam pivotably attached to the engine support structure by a pivot.

The mounting system of any preceding clause, wherein the beam includes a spherical mono-ball bearing capable of having a mount lug connect thereto.

The mounting system of any preceding clause, wherein the at least one actuator is connected to the beam to pivot the beam about the pivot.

The mounting system of any preceding clause, wherein the at least one actuator is a cam.

The mounting system of any preceding clause, wherein the cam is positioned on one side of the pivot and a spring is positioned on the other side of the pivot to counterbalance the cam.

An engine for an aircraft including a rotating airfoil assembly, a torque producing system coupled, and the mounting system of any preceding clause. The rotating airfoil assembly includes a rotation axis and a plurality of rotating airfoils configured to rotate about the rotation axis in a plane of rotation. The torque producing system is coupled to the rotating airfoil assembly and configured to rotate the rotating airfoil assembly about the rotation axis of the rotating airfoil assembly. The torque producing system is connected to the engine support structure by the plurality of mounts.

The engine the preceding clause, wherein the engine is an unducted single fan engine, the torque producing system is a turbomachine of a gas turbine engine, and the rotating airfoil assembly is a fan with each of the plurality of rotating airfoils being fan blades.

The engine of any preceding clause, wherein the at least one actuator operable to change the plane of rotation of the plurality of rotating airfoils.

The engine of any preceding clause, wherein the plurality of mounts includes a forward mount and an aft mount, one of the forward mount or the aft mount being the movable mount.

The engine of any preceding clause, further comprising a controller configured to determine that the aircraft has an angle of attack and to operate the at least one actuator to move the movable mount and change the plane of rotation of the plurality of rotating airfoils based on the angle of attack.

The engine of any preceding clause, wherein the controller is configured to receive an input indicating a pitch of the aircraft, the controller determining that the aircraft has an angle of attack based on the pitch of the aircraft.

A mounting system for an aircraft engine including an engine support structure, a plurality of mounts, and at least one actuator. The engine support structure includes a forward strut and an aft strut. The plurality of mounts are attached to the engine support structure to couple the aircraft engine to the engine support structure. The at least one actuator is operable to move one of the forward strut or the aft strut relative to the other one of the forward strut or the aft strut relative.

The mounting system of the preceding clause, wherein the forward strut is pivotable with respect to the aft strut.

The mounting system of any preceding clause, wherein one mount of the plurality of mounts is a forward mount connected to the forward strut and one mount of the plurality of mounts is an aft mount connected to the aft strut.

The mounting system of any preceding clause, wherein the at least one actuator is movable between a stowed position and an extended position, and moving the at least one actuator the stowed position to the extended position moves the forward strut away from the aft strut.

The mounting system of any preceding clause, wherein moving the at least one actuator the stowed position to the extended position moves the forward strut downward from the aft strut.

The mounting system of any preceding clause, wherein the aft strut includes a curved slot and the forward strut includes and engagement strut that engages with the curved slot and guides rotation of the forward strut as the at least one actuator is moved between the stowed position and the extended position.

The mounting system of any preceding clause, wherein the plurality of mounts is connected to the forward strut.

The mounting system of any preceding clause, further comprising at least one pivot pivotably connecting the forward strut to the aft strut.

The mounting system of any preceding clause, wherein the at least one actuator is positioned relative to the at least one pivot such that extending or retracting the at least one actuator pivots the forward strut about the at least one pivot.

The mounting system of any preceding clause, wherein the at least one actuator is connected to an upper portion of each of the forward strut and the aft strut, and the at least one pivot is located on a lower portion of each of the forward strut and the aft strut.

An engine for an aircraft including a rotating airfoil assembly, a torque producing system, and the mounting system of any preceding clause. The rotating airfoil assembly includes a rotation axis and a plurality of rotating airfoils configured to rotate about the rotation axis in a plane of rotation. The torque producing system is coupled to the rotating airfoil assembly and configured to rotate the rotating airfoil assembly about the rotation axis of the rotating airfoil assembly. The torque producing system is connected to the engine support structure by the plurality of mounts.

The engine of the preceding clause, wherein the at least one actuator operable to change the plane of rotation of the plurality of rotating airfoils.

The engine of any preceding clause wherein the engine is an unducted single fan engine, the torque producing system is a turbomachine of a gas turbine engine, and the rotating airfoil assembly is a fan with each of the plurality of rotating airfoils being fan blades.

The engine of any preceding clause, further comprising a controller configured to determine that the aircraft has an angle of attack and to operate the at least one actuator to move to move one of the forward strut or the aft strut relative and change the plane of rotation of the plurality of rotating airfoils based on the angle of attack.

The engine of any preceding clause, wherein the controller is configured to receive an input indicating a pitch of the aircraft, the controller determining that the aircraft has an angle of attack based on the pitch of the aircraft.

An engine for an aircraft including a torque producing system, a rotating airfoil assembly, and at least one actuator operable to change pitch the rotating airfoil assembly. The torque producing system includes an output shaft. The torque producing system outputs torque via the output shaft. The rotating airfoil assembly includes a rotation axis and a plurality of rotating airfoils configured to rotate about the rotation axis in a plane of rotation. The rotating airfoil assembly includes an input shaft coupled to the output shaft to receive torque from the output shaft and to rotate the rotating airfoil assembly. The input shaft is coupled to the output shaft by a pivotable coupling to allow rotation of the input shaft to change pitch relative to the output shaft.

The engine of the preceding clause, wherein the input shaft of the rotating airfoil assembly is supported by a spherical bearing.

The engine of any preceding clause, wherein the input shaft of the rotating airfoil assembly is supported by a barrel bearing.

The engine of any preceding clause, wherein the pivotable coupling is a constant velocity joint.

The engine of any preceding clause, wherein the pivotable coupling is a differential gearbox.

The engine of any preceding clause, wherein the differential gearbox includes an input gear connected to the output shaft of the torque producing system, an output gear connected to the of the rotating airfoil assembly, and a pair of transfer gears. Each of the input gear and the output gear engage with the pair of transfer gears to transfer the torque from the input gear to the output gear.

The engine of any preceding clause, wherein the transfer gears are positioned to oppose each other on opposite sides of the input gear and the output gear.

The engine of any preceding clause, wherein the torque producing system includes an outer casing, and the rotating airfoil assembly being pivotably connected to the outer casing.

The engine of any preceding clause, wherein rotating airfoil assembly being pivotably connected to the outer casing by a spherical joint.

The engine of any preceding clause, wherein the engine is an unducted single fan engine, the torque producing system is a turbomachine of a gas turbine engine, and the rotating airfoil assembly is a fan with each of the plurality of rotating airfoils being fan blades.

The engine of any preceding clause, further comprising a controller configured to determine that the aircraft has an angle of attack and to operate the at least one actuator to move the rotating airfoil assembly.

The engine of any preceding clause, wherein the controller is configured to receive an input indicating a pitch of the aircraft, the controller determining that the aircraft has an angle of attack based on the pitch of the aircraft.

An engine for an aircraft including a rotating airfoil assembly, at least one actuator, and a torque producing system coupled to the rotating airfoil assembly. The rotating airfoil assembly includes a rotation axis and a plurality of rotating airfoils configured to rotate about the rotation axis in a plane of rotation. The at least one actuator is operable to change the plane of rotation of the plurality of rotating airfoils by pivoting each rotating airfoil as the rotating airfoil rotates about the rotation axis. The torque producing system is configured to rotate the rotating airfoil assembly about the rotation axis of the rotating airfoil assembly.

The engine of the preceding clause, further comprising a plurality of the at least one actuator. One actuator of the plurality of actuators is connected to a corresponding one of the plurality of rotating airfoils forward of the corresponding rotating airfoil and another one of the plurality of actuators is connected to the corresponding rotating airfoil aft of the corresponding rotating airfoil to change the pitch of the corresponding rotating airfoil.

The engine of any preceding clause, wherein the engine is an unducted single fan engine, the torque producing system is a turbomachine of a gas turbine engine, and the rotating airfoil assembly is a fan with each of the plurality of rotating airfoils being fan blades.

The engine of any preceding clause, further comprising a plurality of the at least one actuator, at least one actuator of the plurality of actuators connected to a corresponding one of the plurality of rotating airfoils to change the pitch of the corresponding rotating airfoil.

The engine of any preceding clause, wherein the rotating airfoil assembly includes a hub, each rotating airfoil being pivotably connected to the hub with a pivotable connection that allows the rotating airfoil to change pitch.

The engine of any preceding clause, wherein each rotating airfoil is pivotably connected to the hub by an arcuate groove.

The engine of any preceding clause, wherein arcuate groove is oriented in a forward direction and an aft direction of the engine.

The engine of any preceding clause, further comprising a controller configured to determine that the aircraft has an angle of attack and to operate the at least one actuator to pivot each rotating airfoil as the rotating airfoil rotates about the rotation axis.

The engine of any preceding clause, wherein the controller is configured to receive an input indicating a pitch of the aircraft, the controller determining that the aircraft has an angle of attack based on the pitch of the aircraft.

The engine of any preceding clause, wherein the controller is configured to operate the at least one actuator to move each rotating airfoil independently.

The engine of any preceding clause, wherein the rotating airfoil assembly includes a hub. Each rotating airfoil is pivotably connected to the hub by an arcuate groove. The arcuate groove is oriented in the forward direction and the aft direction of the engine. The controller is configured to operate the at least one actuator to move each rotating airfoil independently between a forward portion of the arcuate groove and an aft portion of the arcuate groove.

The engine of any preceding clause, wherein the controller is configured to position the rotating airfoil in the forward portion of the arcuate groove when the rotating airfoil is located at a twelve o'clock position of the rotating airfoil assembly. The controller is configured to position the rotating airfoil in the aft portion of the arcuate groove when the rotating airfoil is located at a six o'clock position of the rotating airfoil assembly.

The engine of any preceding clause, wherein the rotating airfoil assembly includes a hub. Each rotating airfoil is pivotably connected to the hub by a trunnion and each rotating airfoil being secured within the trunnion by a spherical bearing. The at least one actuator is configured to change the plane of rotation of the plurality by moving each rotating airfoil.

The engine of any preceding clause, wherein the rotating airfoil includes a root having a bulb, the trunnion securing the bulb.

The engine of any preceding clause, wherein the trunnion includes a slot, and the root includes an inner portion extending below the bulb and into the slot.

The engine of any preceding clause, wherein the inner portion is sized relative to the slot to restrict movement in one direction but with a gap permit movement in another.

An aircraft including the engine of any preceding clause.

The aircraft of the preceding clause further comprising a fuselage, and a wing attached to the fuselage.

The aircraft of any preceding clause, wherein the engine is mounted to the wing.

The aircraft of any preceding clause, wherein the engine is mounted to the wing by a pylon in an under-wing configuration.

The aircraft of any preceding clause, wherein the pylon includes the engine support structure of any preceding clause.

The aircraft of any preceding clause, further comprising a flight controller, wherein the controller is communicatively coupled to the flight controller to receive an input from the flight controller.

The aircraft of any preceding clause, wherein the input is one of an angle of attack of the aircraft or a pitch of the aircraft.

The aircraft of any preceding clause, wherein the aircraft includes the sensor.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. An airfoil structure comprising:

an airfoil including a longitudinal axis; and a spring and damper system connected to the airfoil to rotate the airfoil about the longitudinal axis to change a pitch of the airfoil in response to a load applied to the airfoil, the spring and damper system including a plurality of dampers operatively engaged with the airfoil and arranged to impart a rotational force to the airfoil, each damper of the plurality of dampers being a hydraulic damper and fluidly connected to each other via a fluid conduit that facilitates a flow of a hydraulic fluid between the plurality of dampers, wherein the airfoil structure is one of a plurality of airfoil structures of a rotating airfoil assembly, the airfoil being rotatable about the longitudinal axis via the spring and damper system independent of each airfoil of the other airfoil structures of the plurality of airfoil structures.

2. The airfoil structure of claim 1, wherein the spring and damper system further includes a spring operatively engaged with the airfoil and arranged to counterbalance the rotational force imparted by the plurality of dampers.

3. The airfoil structure of claim 2, wherein the airfoil further includes a root, and the plurality of dampers and the spring are connected to the root to impart the rotational force to the root.

4. The airfoil structure of claim 3, further comprising a trunnion including a bearing, wherein the root includes a bulb secured in the trunnion by the bearing to allow rotation of the bulb about the longitudinal axis.

5. The airfoil structure of claim 4, wherein the root includes an inner portion extending below the bulb and into a slot formed in the trunnion, the plurality of dampers and the spring being connected to the inner portion of the root.

6. The airfoil structure of claim 1, wherein each damper of the plurality of dampers includes a piston, and wherein the plurality of dampers includes a large damper and a small damper, the piston of the small damper having a smaller surface area than the piston of the large damper.

7. The airfoil structure of claim 6, wherein the large damper and the small damper are positioned on opposite sides of the longitudinal axis.

8. The airfoil structure of claim 1, wherein the plurality of airfoil structures is rotatable about a rotation axis of the rotating airfoil assembly.

9. An airfoil structure comprising:

an airfoil including a longitudinal axis; and a spring and damper system connected to the airfoil to rotate the airfoil about the longitudinal axis to change a pitch of the airfoil in response to a load applied to the airfoil, the spring and damper system including a plurality of dampers operatively engaged with the airfoil and arranged to impart a rotational force to the airfoil, wherein each damper of the plurality of dampers is fluidly connected to each other and includes a piston, the plurality of dampers including a large damper and a small damper with the piston of the small damper having a smaller surface area than that of the piston of the large damper.

10. The airfoil structure of claim 9, wherein the large damper and the small damper are positioned on opposite sides of the longitudinal axis.

11. The airfoil structure of claim 9, wherein the small damper imparts a smaller pressure load to the airfoil than the large damper.

12. The airfoil structure of claim 9, wherein the airfoil further includes a leading edge, a trailing edge, and a chord extending from the leading edge to the trailing edge, and wherein the large damper and the small damper are positioned on opposite sides of the chord.

13. The airfoil structure of claim 12, wherein the spring and damper system further includes a spring operatively engaged with the airfoil and arranged to counterbalance the rotational force imparted by the plurality of dampers, the spring being positioned on the same side of the chord as the large damper.

14. The airfoil structure of claim 12, wherein the airfoil further includes a pressure side and a suction side, and wherein the large damper is positioned on the pressure side and the small damper is positioned on the suction side.

15. The airfoil structure of claim 14, wherein the spring and damper system further includes a spring operatively engaged with the airfoil and arranged to counterbalance the rotational force imparted by the plurality of dampers, the spring being positioned on the pressure side.

16. The airfoil structure of claim 10, wherein the spring and damper system further includes a spring operatively engaged with the airfoil and arranged to counterbalance the rotational force imparted by the plurality of dampers, the spring being positioned on the same side of the longitudinal axis as the small damper.

17. The airfoil structure of claim 10, wherein the airfoil further includes a leading edge, a trailing edge, and wherein the large damper is positioned on a forward end closer to the leading edge than the trailing edge, and the small damper is positioned on a trailing end closer to the trailing edge than the leading edge.

18. The airfoil structure of claim 17, wherein the spring and damper system further includes a spring operatively engaged with the airfoil and arranged to counterbalance the rotational force imparted by the plurality of dampers, the spring being positioned on the trailing end.

19. An engine comprising:

a rotating airfoil assembly including a plurality of airfoil structures rotatable about a rotation axis of the rotating airfoil assembly, each airfoil structure of the plurality of airfoil structures including:

an airfoil including a longitudinal axis; and a spring and damper system connected to the airfoil to rotate the airfoil about the longitudinal axis to change a pitch of the airfoil in response to a load applied to the airfoil, each airfoil of the plurality of airfoil structures being rotatable about the longitudinal axis via the spring and damper system independent of the airfoils of the other airfoil structures of the plurality of airfoil structures; and a torque producing system coupled to the rotating airfoil assembly and arranged to rotate the rotating airfoil assembly about the rotation axis of the rotating airfoil assembly.

20. The engine of claim 19, wherein the engine is an unducted single fan engine, the torque producing system being a turbomachine of a gas turbine engine, the rotating airfoil assembly being a fan with each airfoil being a fan blade.

* * * * *